United States Patent
Eteminan et al.

(10) Patent No.: US 8,719,776 B2
(45) Date of Patent: May 6, 2014

(54) SYSTEM FOR CREATION AND DISTRIBUTION OF SOFTWARE APPLICATIONS USABLE ON MULTIPLE MOBILE DEVICE PLATFORMS

(75) Inventors: Isaac Eshagh Eteminan, Rancho Santa Fe, CA (US); Marco Carosi, Rome (IT); Harish Shanthikumar, Bangalore (IN)

(73) Assignee: Foneclay, Inc., Rancho Santa Fe, CA (US)

( * ) Notice: Subject to any disclaimer, the term of this patent is extended or adjusted under 35 U.S.C. 154(b) by 799 days.

(21) Appl. No.: 12/649,947

(22) Filed: Dec. 30, 2009

(65) Prior Publication Data

US 2011/0161912 A1 Jun. 30, 2011

(51) Int. Cl.
*G06F 9/44* (2006.01)

(52) U.S. Cl.
USPC ............ 717/113; 717/106; 717/109; 717/124

(58) Field of Classification Search
None
See application file for complete search history.

(56) References Cited

U.S. PATENT DOCUMENTS

| | | | |
|---|---|---|---|
| 7,127,705 B2 | 10/2006 | Christfort et al. | |
| 7,339,891 B2 | 3/2008 | Binder et al. | |
| 7,814,404 B2 * | 10/2010 | Shenfield | 715/200 |
| 2002/0033843 A1 | 3/2002 | Loos et al. | |
| 2003/0139199 A1 | 7/2003 | Kinnula et al. | |
| 2007/0010195 A1 | 1/2007 | Brown et al. | |
| 2009/0300578 A1 * | 12/2009 | Neil | 717/104 |
| 2010/0005410 A1 | 1/2010 | Pang | |
| 2012/0089906 A1 * | 4/2012 | Reeves et al. | 715/255 |

FOREIGN PATENT DOCUMENTS

| | | |
|---|---|---|
| WO | WO 03/081389 A2 | 10/2003 |
| WO | WO 2008/031070 A2 | 3/2008 |

* cited by examiner

*Primary Examiner* — Chuck Kendall
(74) *Attorney, Agent, or Firm* — Thomas D. Foster; Bruce Hare

(57) ABSTRACT

The present invention provides a mobile application ecosystem comprising a mobile application development kit and store, both of which are implemented as web-based services such that creation, testing, and distribution of mobile applications, as well as discovery, investigation, and delivery of same, can all be performed using a standard web browser. The mobile application development kit offers common capabilities across all target mobile device brand and brand groups, allowing the same application construct to work unmodified on all, while building the application in a manner that is native to each, thereby avoiding any requirement to embed a separate common runtime or virtual machine on every mobile device.

35 Claims, 7 Drawing Sheets

SYSTEM FOR CREATION AND DISTRIBUTION OF SOFTWARE APPLICATIONS USABLE ON MULTIPLE MOBILE DEVICE PLATFORMS

TECHNICAL FIELD OF THE INVENTION

The present invention pertains in general to creation and distribution of mobile application software. The present invention pertains in particular to a system that enables both professionals and novices to create software applications which are executable without modification on multiple mobile device platforms, and to distribute such applications across a broad customer base in a significantly simpler and more widely applicable manner than is currently available.

BACKGROUND OF THE INVENTION

There exists today a wide variety of small, typically handheld, electronic appliances known generally as mobile internet devices, including in particular the vast array of products commonly known as mobile phones. Nearly all such devices now provide a mechanism for obtaining and executing mobile applications, also known as mobile apps, which are software modules that impart new functionality to a mobile device, such as games and other entertainments, information management tools, business tools, and a multitude of others. Mobile applications are generally distributed via an online "store," which is typically implemented as a specialized combination of interne website and mobile application designed to present an environment for discovering, investigating, purchasing, and downloading mobile applications that did not come preloaded on the mobile device. In today's business environment and at the current level of technology maturity, each manufacturer or distributor of a particular mobile device brand provides a store dedicated to that brand. Popular examples include Apple's iPhone App Store, RIM's Blackberry App World, Nokia's Ovi, and Palm's webOS App Catalog.

Also associated with each brand of mobile device is a development kit, which is a set of tools used by software developers to create mobile applications and offer the created mobile applications for distribution via the corresponding online store. While many development kits use certain common technologies rooted in standards, such as the Java or C programming languages, XML-based data description formats, and the Eclipse-based tool framework, the variety of combinations is quite large and it is rare for mobile device brands to share enough of the tools in their respective development kits for applications written on one to work without modification on another. Of particular interest in this area are the groups of device brands that share a software layer known as an operating system, or OS. For example, multiple device manufacturers incorporate Microsoft's Windows Mobile or some form of Linux, thereby achieving significant commonality of development kit. However, in this architecture pattern each device brand adds device-specific components such as hardware drivers and presentation styles on top of the OS, such that all but the simplest applications built for one device brand remain unusable on another, even within the same OS group.

In addition to the device-specific and OS-specific development kits described in the foregoing, generic development kits have begun to emerge that attempt to offer an abstract device model, typically through an API that is implemented with identical semantics and identical syntax on multiple device brands or multiple operating systems. Such tools ease somewhat the application developer's burden, by allowing the same software source code to be used for an application that will be built and deployed on multiple device brands and potentially multiple operating systems. However, so far as they exist today these tools still force the developer to use the various device-specific development kits for the final steps of packaging and deploying the corresponding device-specific application versions. Further, the generic-model development kits that exist today, including for example Appcelerator and Antenna Mobility Platform, do not achieve the status of device or OS brands known to end users, and therefore cannot successfully offer a corresponding store, or distribution environment.

Thus, in general an application developer who wishes to make a particular mobile application available on multiple mobile device brands must develop and test that application in multiple development kits, and submit each finished product separately to the corresponding online store. When a new brand emerges with its own unique development kit and store, the application must be created, or at least built and tested, yet again if it is to be available for users of mobile devices under that brand.

The complexity of existing development kits, whether device-specific, OS-specific, or generic, creates a further constraint on the current art. Specifically, the text-based programming languages and computer-like software architectures that form the basis of today's mobile application infrastructure have created a situation in which the skills and knowledge required to create a mobile application tend to exist primarily among professional programmers and prodigies, whose abstract mathematical abilities and logical thought processes have been honed through education, inspired by innate talent, or both. This creates a challenging barrier for creative people whose talents lie in other areas or whose education has not advanced so far, who also have ideas for unique mobile applications that may be interesting or useful to themselves and others. The vast majority of mobile device users, who may for example be children or parents, teachers or students, nurses or patients, and workers, professionals, managers, or retirees in any number of fields, are not professional programmers or mathematical prodigies and have no means today of expressing their ideas and embodying their ideas in mobile applications, much less of sharing those applications with others who could use or enjoy them. In the domain of personal computers it has been known for decades that children, for example, can create interesting software using such tools as Logo and, more recently, Scratch and Alice. No such breakthrough has yet been achieved in the domain of mobile devices, although at this writing a version of Scratch for mobile devices is being developed (http://llk.media.mit.edu/projects.php?id=1974).

In addition to the difficulty of mobile application development, there is the further complexity of verification testing. Programming specialists will generally execute a significant number of behavioral and performance tests to ensure that a mobile application does what it is meant to do in the presence of intended conditions and stimuli (positive behavior test cases), does something sensible in the presence of unintended conditions or stimuli (negative behavior test cases), and in any case performs with appropriate user responsiveness (performance test cases). A novice programmer or non-specialist, on the other hand, may be able to identify and execute a subset of the appropriate positive behavior test cases, but will generally not be able even to recognize the need for the remainder of the desired test cases.

The mobile application developer is not the only party on which a testing burden falls. The proprietor of each mobile application store, being a device manufacturer, distributor, or service provider, has an interest in ensuring that users of the corresponding devices receive a consistent experience and are not harmed by ill-designed or even malicious mobile applications. In general, to provide such a user experience drives each store to be backed by a staff of testing specialists who examine each submitted mobile application prior to making it available for widespread distribution. These specialists are no doubt equipped with various tools that facilitate and simplify the process of verifying whether a mobile application's behavior and performance conform to the store's norms. Tools which may be applied in this situation, well known to those skilled in the art, include malware scanners, device emulators, and automated test execution environments that work with test cases submitted by the developer along with the application. The intervention of specialists to apply these tools and determine whether a mobile application is suitable for distribution introduces delay and uncertainty between developer and customer, and features the potential for human error that could allow inappropriate applications through or block applications unnecessarily.

What is needed, then, is a system whereby mobile device users who are not programming specialists may create mobile applications and offer the created applications for distribution to others, without regard for any specific device's brand, model, OS, dedicated development kit, or dedicated application store. Such a system will preferably automate the testing of individual mobile applications for any and all device brands, models, and operating systems, both to verify the application's conformance to user experience rules and to assist the application's creator in achieving the intended behaviors. Such a system, further, will preferably enable communication and interaction between and among application creators, end users, and other interested persons, so as to facilitate creation, distribution, discovery, investigation, provision, customization, utilization, and improvement of interesting, entertaining, and useful mobile applications. Such a system will also preferably permit new applications to be created through attribute customization of existing applications, incorporation of various existing application components, and even incorporation of entire existing applications, with a minimum of effort and detailed technical knowledge by application creators.

SUMMARY OF THE INVENTION

It is thus the principal aim of the present invention to create a mobile application ecosystem that is simpler than existing options for all of its participants regardless of their role or business model. Accordingly, it is an advantage of the present invention that a mobile application development kit and store are provided as a web-based service such that creation, testing, and distribution of mobile applications, as well as discovery, investigation, and delivery of same, can all be performed using a standard web browser. It is a further advantage that the mobile application development kit according to the present invention offers common capabilities across all target mobile device brands, allowing the same application construct to work unmodified on all of target mobile devices while building the application in a manner that is native to each mobile device brand or brand group, thereby avoiding any requirement to embed a separate common runtime or virtual machine on mobile devices of every brand or brand group. It is a further advantage that the mobile application store according to the present invention is also not specific to any mobile device brand or brand group. It is a further advantage of the present invention that the web-based mobile application development kit and store are integrated with one another such that creation of new mobile applications can be accelerated by incorporation or customization of existing mobile applications or components thereof.

A further advantage of the present invention is the aspect of automatic verification, such that intervention of human specialists is not required to determine whether a particular mobile application is suitable for distribution according to such factors as rules of user experience conformity, performance expectations, and appropriate interactions with other applications; whereby both skilled and unskilled developers may benefit from the execution of thorough test suites covering all positive behavior, negative behavior, and performance aspects of a mobile application's intended purpose; and whereby the functionality and performance of a mobile application may be automatically verified on all capable devices of every brand or brand group.

An additional advantage of the present invention is the aspect of the web-based mobile application development kit, which incorporates a tool for creating and embodying logic, interfaces, and data, whereby it can be used intuitively by all people, including children and adults who are not skilled software developers, while, at the same time offering compatible advanced capabilities to those who are so skilled. Yet another advantage of the present invention is its ability to facilitate communication, interaction, community, and sharing among and between mobile application creators, users, and other interested parties.

The above and other advantages of the present invention are carried out in one form by a system of cooperating elements, each of which is described in detail below.

BRIEF DESCRIPTION OF THE DRAWINGS

The invention will be better understood from a reading of the following detailed description in conjunction with the drawing figures, in which like reference designators are used to identify like elements and in which.

DETAILED DESCRIPTION OF THE PREFERRED EMBODIMENTS

Figure 1:
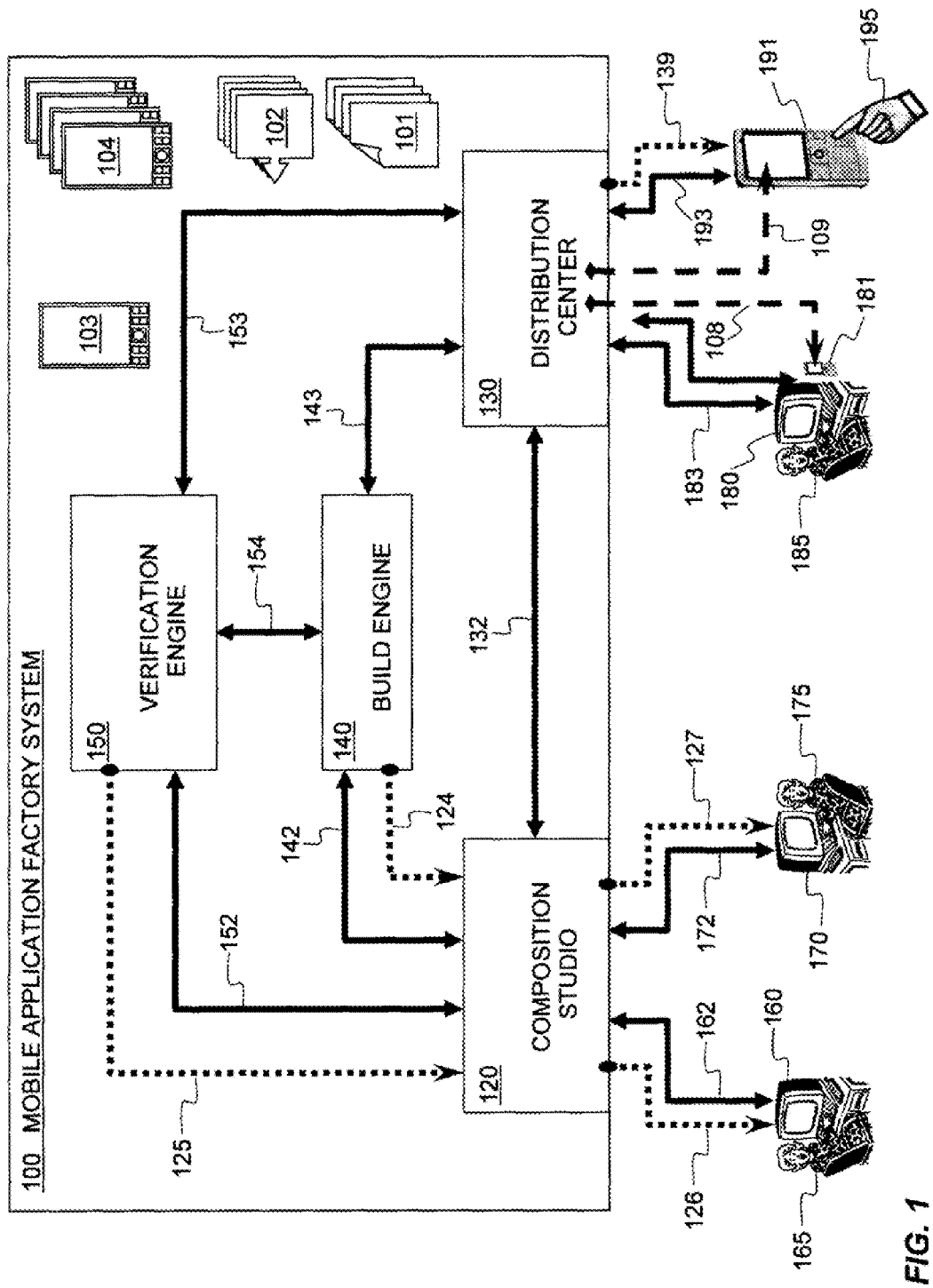
FIG. 1 illustrates a high-level block diagram of a Mobile Application Factory System in accordance with the present invention.

The high-level diagram of FIG. 1 depicts the primary elements of the present invention, including the main system, its major subsystems and primary internal elements, and the primary external elements with which it interacts. In the diagram, Mobile Application Factory System 100 embodies the functionality as outlined in the Summary section above and detailed in the subsystem descriptions that follow. The functions of Mobile Application Factory System 100 are allocated among four major subsystems, with interactions among the four major subsystems as shown. In addition, four primary internal elements are shown, which embody the reason for existence of Mobile Application Factory System 100 in the first place.

The first primary internal element is the set of one or more Mobile Device Applications 101 which are produced, managed, and distributed using Application Factory System 100. Each Application 101 is a package of logic and data created by a developer to perform one or more particular functions upon execution by a mobile device. By way of example, but without limitation, an Application 101 may display a sequence of images, take a photograph or capture a location and share it with others, or play a complex game involving one or more people. Note that while FIG. 1 depicts just four Applications 101, in a preferred embodiment the actual number is essentially unlimited.

In addition to Mobile Device Applications 101, developers may create a set of one or more Mobile Device Application Components 102. Each Application Component 102 is a package of logic and data encapsulating a set of related functionality that may be useful in numerous Applications 101. In general Application Components 102 do not stand alone, but may be combined with additional logic and perhaps other Application Components 102 in order to form an Application 101. Note that while FIG. 1 depicts just four Application Components 102, in a preferred embodiment the actual number is essentially unlimited.

Application Factory System 100 incorporates a single abstraction of a mobile device that all Applications 101 and Application Components 102 will execute on. This Generic Mobile Device Model 103 is used as a common platform for development, testing, simulation, and demonstration of any Application 101. Having a common target ensures consistency of performance across multiple real target mobile devices and multiple Applications 101, and cases the learning process for novice developers. Generic Mobile Device Model 103 embodies a superset of the features and capabilities found in real mobile devices and well known to those skilled in the art, including without limitation modules for wireless connectivity with a cellular network, Wifi hot spots, and Bluetooth devices; support for communication modes such as signalling, circuit calls, and packet transmission and reception; ports for wired connectivity with nearby devices such as a headphone jack and a USB connector; various human interface devices including primary and optional secondary video display screens, a numeric or alphabetic keypad that may be optionally backlit, miscellaneous buttons that activate functions such as speaker volume control and others, a touchpad or multitouch gesture input pad, speakers, and microphones; environment sensors and effectors such as an accelerometer or motion and orientation sensor, a camera or light sensor, a Global Positioning System (GPS) receiver or other location sensor, a mechanical vibration generator or other haptic effector, and a thermometer or other temperator sensor. Generic Mobile Device Model 103 features a common operating system and application programming interface supporting access to all included capabilities by Applications 101.

While Generic Mobile Device Model 103 supports commonality of feature behavior across multiple Applications 101, it is also desirable for Application Factory System 100 to support the specific hardware and software associated with real mobile devices, so that developers may ensure their Applications 101 and Application Components 102 work in one or more actual devices, or even to target development specifically to only one actual device. To that end, Application Factory System 100 incorporates as the fourth and final primary internal element an extensible set of one or more Specific Mobile Device Models 104, each of which embodies the specific features and capabilities of a real mobile device type. To the extent possible each Specific Mobile Device Model 104 is a specialization of Generic Mobile Device Model 103, but in general platform details such as the real software operating system—Symbian, Windows, Linux, WebOS, and so forth—and real device programming interfaces are included. As well, visual elements such as a graphical representation of the actual mobile device, and behavior elements such as an execution simulator, are provided in each Specific Mobile Device Model 104. In a preferred embodiment, most aspects of a Specific Mobile Device Model 104 are incorporated in Application Factory System 100 by embedding or providing programmatic access to the features of the real device's actual software development toolkit, thereby ensuring the most accurate possible representation.

The first major subsystem, Composition Studio 120, embodies the functions associated, with a development environment, providing the ability to develop Applications 101 and Application Components 102. Composition Studio 120 supports multiple programming paradigms, natively including at least a novice mode suitable for Novice Developer 165 in which features are constrained and logical elements are represented visually, and an expert mode suitable for Expert Developer 175 in which all features are available and logical elements are represented textually. Non-native programming modes may also be supported by importing all features into Composition Studio 120. For example, a mode that uses the Scratch programming language from MIT or the Alice programming language from CMU may be included as an option for Novice Developer 165, while a mode that uses an Eclipse-based Java development environment may be included as an option for Expert Developer 175. For ease of use, the various available modes may be presented to a user as a progression of selectable levels with increasing complexity or capability. For example, level 0 would be the simplest and easiest to use, with each data, logic, and graphic object visible only when it is usable, and with every option available via intuitive mouse gestures such as rolling over a label or clicking and dragging an icon. In a preferred embodiment Level 0 is the default for Novice Developer 165. A simplified Scratch-like mode may be available as Level 1, which in a preferred embodiment may be selected as an alternative programming mode over Level 0. Scratch itself might be available as Level 2, while an Eclipse-like mode with multiple graphical and textual windows might be available as Level 3. In a preferred embodiment, such a Level 3 is the default for Expert Developer 175. Levels may also be accessed and utilized flexibly through toggling preference items that enable different feature sets, as an alternative to accessing levels as sequentially numbered monolithic feature sets. Additional detail on the features and presentation of different programming modes is provided in the descriptions of FIG. 2 and FIG. 6.

A user of Composition Studio 120 accesses its capabilities using a computer workstation or personal computer, as is typical of such tools and well-known to those skilled in the art. In FIG. 1, Novice Developer 165 employs Computer 160 for this purpose, while Expert Developer 175 employs Computer 170 similarly. In either case, the actual implementation of Composition Studio 120 is itself a software program executing in a computer.

Two execution modes are possible in a preferred embodiment, the service mode and the application mode. In the service mode, Composition Studio 120 executes in a centralized server computer and presents its user interface to Novice Developer 165 and Expert Developer 175 through any of several standard and well-known web browser programs running in, respectively, Computers 160 and 170. The interactions between Composition Studio 120 and Computers 160 and 170 in the service mode take place using standard protocols, well known to those skilled in the art, such as IP, HTTP, and HTML, represented in FIG. 1 by Network Connections 162 and 172 respectively. In the application mode, Composition Studio 120 is packaged as a computer software application that executes directly in Computers 160 and 170 after being downloaded and installed via well-known means represented in FIG. 1 by Embedments 126 and 127 respectively. Programming technology well-known to those skilled in the art, such as Adobe Air or Google Gears, is used in the preferred embodiment to create a single program that supports both service and application execution modes, thereby enabling either users or system administrators to determine which execution mode is appropriate without having had to develop two separate programs.

Figure 2:
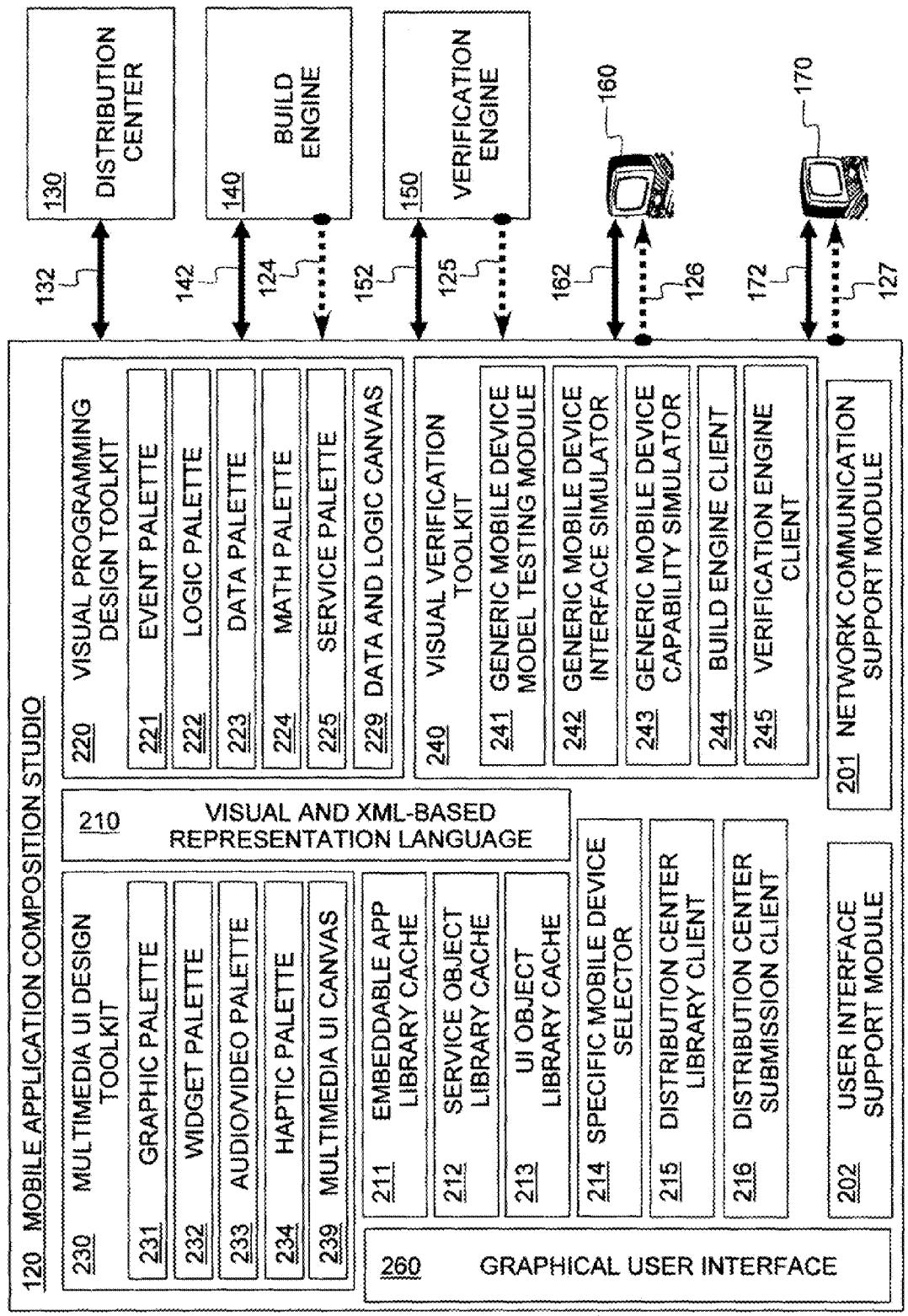
FIG. 2 illustrates a detailed functional block diagram of a Mobile Application Composition Studio in accordance with the present invention.

More detail regarding Composition Studio 120 is provided in the description of FIG. 2.

The second major subsystem, Distribution Center 130, embodies the functions associated with an application repository, often called an "app store" in common usage. Distribution Center 130 supports discovery of, education on, demonstration of, experimentation with, and finally acquisition of Applications 101 and Application Components 102, for any of the Specific Mobile Device Models 104 supported by Application Factory System 100. Acquisition of a selected Application 101 or Application Component 102 may follow collection of a payment if said selected Application 101 or Application Component 102 has an associated price; certain Applications 101 and Application Components 102 may also be offered free of charge. Distribution Center 130 provides the aforementioned capabilities to customers, represented in FIG. 1 by Internet Customer 185 and Mobile Customer 195.

Internet Customer 185 accesses the capabilities of Distribution Center 130 using a computer workstation or personal computer, as is typical of "app stores" and well-known to those skilled in the art, employing Computer 180 for this purpose. The actual implementation of Distribution Center 130 is itself a software program executing in a centralized server computer that presents its user interface to Internet Customer 185 through any of several standard and well-known web browser programs running in Computer 180. The interactions between Distribution Center 130 and Computer 180 take place using standard protocols, well known to those skilled in the art, such as IP, HTTP, and HTML, represented in FIG. 1 by Network Connection 183. Upon selecting an Application 101 for acquisition, whether for a price or free of charge, a copy of said selected Application 101 is transferred into Mobile Device 181 belonging to Internet Customer 185 using Application Download 108. In a preferred embodiment, Application Download 108 occurs directly into Mobile Device 181 via the wireless network to which Mobile Device 181 normally attaches, using over-the-air transmission techniques well known to those skilled in the art. Alternatively, Application Download 108 may occur over Network Connection 183 into Computer 180, and thence under the control of Internet Customer 185 into Mobile Device 181 via a wired connection and driver software, neither of which is shown in FIG. 1, that are typical of most mobile device models and well known to those skilled in the art.

Mobile Customer 195 accesses the capabilities of Distribution Center 130 directly using Mobile Device 191, employing either of two techniques typical of "app stores" and well known to those skilled in the art, both of which provide equivalent functionality as previously described, including ultimately the acquisition of Applications 101 using Application Download 109. Application Download 109 is similar to Application Download 108; it may occur directly into Mobile Device 191 via the associated wireless network using over-the-air transmission, or via an inferred Computer 190 that is not shown in FIG. 1. In the first "app store" technique, Mobile Customer 195 activates a general-purpose web browser software program similar to that used by Internet Customer 185, which in turn interacts with Distribution Center 130 via Network Connection 193 using the same standard protocols as those found in Network Connection 183. In the second technique, a purpose-built software program dedicated to accessing Distribution Center 130 and itself effectively implementing the user interface aspects of Distribution Center 130 directly, is installed in Mobile Device 191 as Embedment 139. Embedment 139 is typically implemented upon manufacture of Mobile Device 191 as a portion of its embedded operating software. Alternatively, Embedment 139 may occur as a specific Application 101 acquired from Distribution Center 130 using Network Connection 193 and downloaded using Application Download 109. In a preferred embodiment, both "app store" techniques are provided and both implementations of Embedment 139 are supported.

In addition to supporting ordinary customers such as Internet Customer 185 and Mobile Customer 195 via their respective connections as described above, Distribution Center 130 provides the aforementioned capabilities to application developer customers, such as Novice Developer 165 and Expert Developer 175, for the purpose of embedding existing Applications 101 or Application Components 102 in their own new Applications 101 or Application Components 102. Interaction 132 between Distribution Center 130 and Composition Studio 120 provides the mechanism whereby developers utilize Distribution Center 130 through Composition Studio 120 for this purpose. Interaction 132 also allows a developer using Composition Studio 120 to offer a completed Application 101 or Application Component 102 for distribution via Distribution Center 130, including the ability to establish the price ordinary customers or developer customers will pay to use or embed, respectively, the offered Application 101 or Application Component 102. In a preferred embodiment, pricing is also subject to policies enforced by the proprietor of Application Factory System 100.

In support of its discovery and education functions in particular, Distribution Center 130 provides its ordinary and developer customers with mechanisms for rating and reviewing applications, as well as sharing their impressions, recommendations, and warnings with one another. These information and communication facilities take common internet shopping and social networking forms well known to those skilled in the art, such as customer ratings, blogs, reviews, comments, short messages, seller reputations, friends, buddy lists, and so forth. As is common in such systems today, Distribution Center 130 uses the data acquired in the course of providing these social networking and shopping services to propose purchases and present advertisements to individual customers, as well as to track market behavior on behalf of mobile device manufacturers and application developers, again using techniques that are well known to those skilled in the art.

Figure 3:
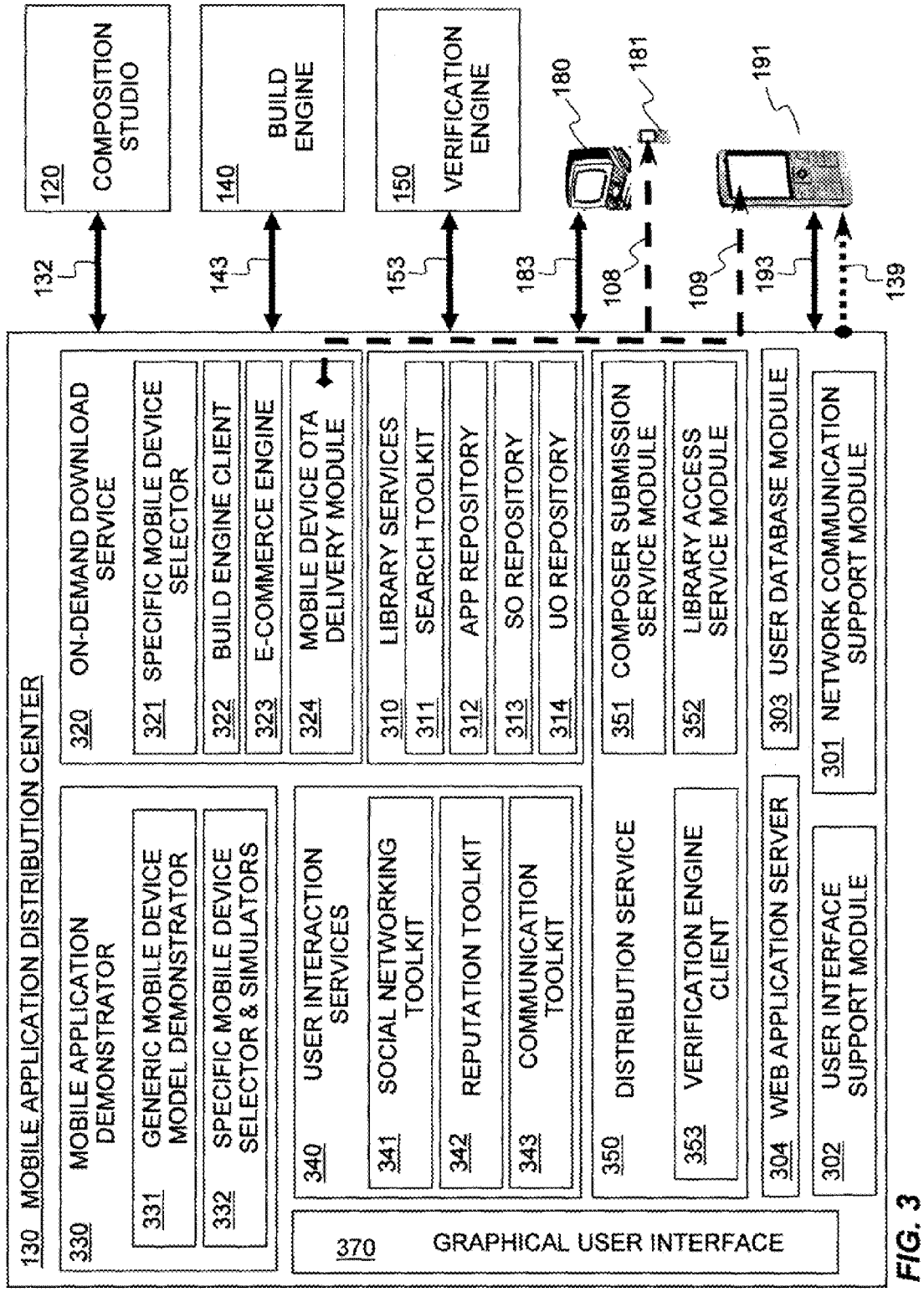
FIG. 3 illustrates a detailed functional block diagram of a Mobile Application Distribution Center in accordance with the present invention.

More detail regarding Distribution Center 130 is provided in the description of FIG. 3.

The third major subsystem, Build Engine 140, provides compilation and linking services to the other subsystems. Build Engine 140 takes a source code package created by Composition Studio 120 or stored in Distribution Center 130, and turns the source code into executable objects embodying a particular Application 101 or Application Component 102 for the Generic Mobile Device Model 103 and the supported Specific Mobile Device Models 104.

The actual implementation of Build Engine 140 is itself a software program executing in a computer. Two execution modes exist in a preferred embodiment, the application mode and the service mode. The application mode of Build Engine 140 is similar to the application mode of Composition Studio 120, and is used in the same circumstances. That is, when Composition Studio 120 is packaged as a software application to run in a developer's computer directly, Build Engine 140 is also included in the same application package via Embedment 124. The Build Engine 140 operating in application mode serves primarily the Composition Studio 120 with which it is packaged.

In the service mode, Build Engine 140 executes in a centralized server computer and operates upon request from its various peers, according to protocols built upon standard techniques well known to those skilled in the art, such as SOAP. Service Interaction 142 allows Composition Studio 120 to request build services of Build Engine 140, and receive the resulting objects, during the application development process. Service Interaction 143 allows Distribution Center 130 to build a specific Application 101 for a specific Mobile Device 181 or Mobile Device 191, which conforms to one of the supported Specific Mobile Device Models 104, but for which Distribution Center 130 does not have an executable version; this supports situations in which a developer provides builds of Application 101 for only a subset of Specific Mobile Device Models 104, or in which a new Specific Mobile Device Model 104 comes into existence after creation and initial distribution of Application 101.

In a preferred embodiment, the service mode of Build Engine 140 exists and operates regardless of whether the application mode exists, so as to support interactions with and provide services to other centralized subsystems. Further, the service mode of Build Engine 140 provides access to compilation and linking for Specific Mobile Device Models 104 which may have been added to Application Factory System 100 since packaging a particular instantiation or version of the Build Engine 140 and Composition Studio 120 application mode, thereby ensuring that developers are not stranded.

Figure 4:
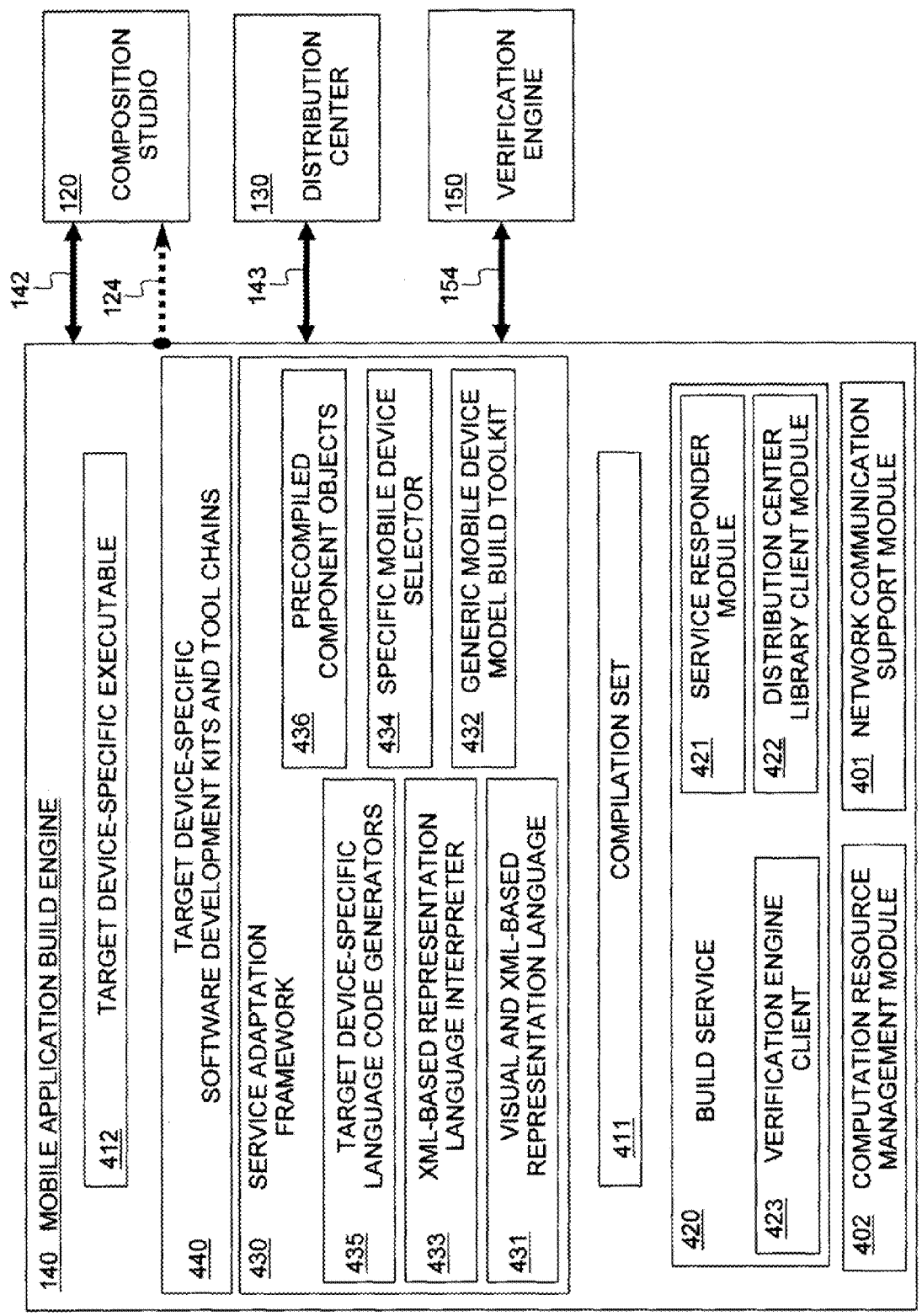
FIG. 4 illustrates a detailed functional block diagram of a Mobile Application Build Engine in accordance with the present invention.

More detail regarding Build Engine 140 is provided in the description of FIG. 4.

The fourth and final major subsystem of Mobile Application Factory System 100 is Verification Engine 150, which provides mobile device simulation and testing capabilities used by developers and the other subsystems. During development of an Application 101 or Application Component 102, Novice Developer 165 or Expert Developer 175 will reach a point at which simulated execution of the developed software is appropriate in order to ascertain proper behavior. Verification Engine 150 presents a user interface by which the developer may step through the various inputs, computations, and outputs of the application and examine the results, much as a traditional software developer might do with a traditional debugger. In the preferred embodiment, simulations for both Generic Mobile Device Model 103 and multiple Specific Mobile Device Models 104 are provided, allowing the application developer not only to verify correct execution on the widest possible selection of supported Specific Mobile Device Models 104, but also to assure a high probability of success on other Specific Mobile Device Models 104 that may be added to Application Factory System 100 at a later date through verification on the Generic Mobile Device Model 103. Further, in the preferred embodiment Verification Engine 150 also provides a library of test cases suitable for use in testing various classes of Applications 101 and Application Components 102, as well as an automated testing environment in which multiple test cases can be selected and executed without developer interaction.

The actual implementation of Verification Engine 150 is itself a software program executing in a computer. Two execution modes exist in a preferred embodiment, the application mode and the service mode. The application mode of Verification Engine 150 is similar to the application mode of Composition Studio 120, and is used in the same circumstances. That is, when Composition Studio 120 is packaged as a software application to run in a developer's computer directly, Verification Engine 150 is also included in the same application package via Embedment 125. The Verification Engine 150 operating in application mode serves primarily the Composition Studio 120 with which it is packaged.

In the service mode, Verification Engine 150 executes in a centralized server computer and operates upon request from its various peers, according to protocols built upon standard techniques well known to those skilled in the art, such as SOAP. Service Interaction 152 allows Composition Studio 120 to operate testing and simulation services of Verification Engine 150 interactively during the application development process. Service Interaction 153 allows Distribution Center 130 to request automatic verification of a specific Application 101 for a specific Mobile Device 181 or Mobile Device 191, which conforms to one of the supported Specific Mobile Device Models 104, but for which Distribution Center 130 does not have an verified version; this supports situations in which a developer provides verified builds of Application 101 for only a subset of Specific Mobile Device Models 104, or in which a new Specific Mobile Device Model 104 comes into existence after creation and initial distribution of Application 101. Similarly, Service Interaction 154 allows Build Engine 140 to request automatic verification of a specific Application 101 for multiple Specific Mobile Device Models 104. This supports a scenario or use case in which a developer tests Application 101 only against the Generic Mobile Device Model 103 or a single Specific Mobile Device Model 104, then submits a bulk build request for the remainder of supported Specific Mobile Device Models 104; Build Engine 140 would in turn request bulk automatic verification of Application 101 for all supported Specific Mobile Device Models 104.

In a preferred embodiment, the service mode of Verification Engine 150 exists and operates regardless of whether the application mode exists, so as to support interactions with and provide services to other centralized subsystems. Further, the service mode of Verification Engine 150 provides access to testing and simulation for Specific Mobile Device Models 104 which may have been added to Application Factory System 100 since packaging a particular instantiation or version of the Verification Engine 150 and Composition Studio 120 application mode, thereby ensuring that developers are not stranded.

Figure 5:
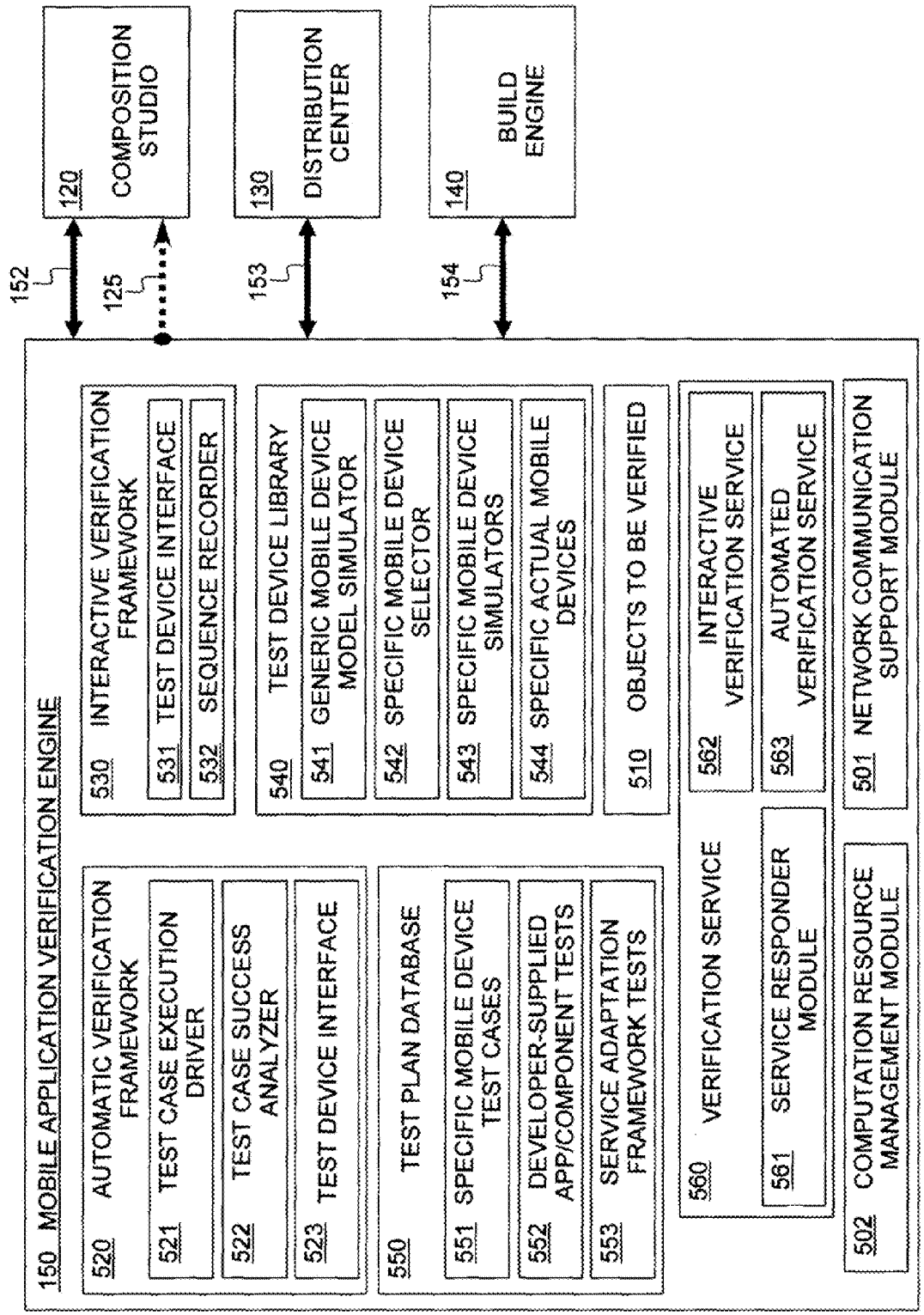
FIG. 5 illustrates a detailed functional block diagram of a Mobile Application Verification Engine in accordance with the present invention.

More detail regarding Verification Engine 150 is provided in the description of FIG. 5.

FIG. 2 depicts Mobile Application Composition Studio 120 in more detail, showing the major functional modules that embody the functionality outlined in the FIG. 1 description. As in FIG. 1, the significant external interfaces and corresponding cooperating elements outside Composition Studio 120 are also shown. The Distribution Center 130, Build Engine 140, Verification Engine 150, Service Interactions 132, 142, and 152, Embedments 124 and 125, Computers 160 and 170, Network Connections 162 and 172, and Embedments 126 and 127 shown in FIG. 2 are substantially as already described in the context of FIG. 1.

Starting at the bottom of the diagram are fundamental modules typically found in any modern software program. Network Communication Support Module 201 provides connectivity with other subsystems of Application Factory System 100, and contains such common and well known components as an inter-process message-passing software bus, message structure parsing toolkits, a TCP/IP protocol stack implementation, and networking hardware drivers appropriate for the computer hardware on which Composition Studio 120 runs. User Interface Support Module 202 provides tools for presenting information visually to a user of Composition Studio 120, such as Novice Developer 165. In a preferred embodiment, User Interface Support Module 202 takes the form of a portable and generic application programming interface (API), well known to those skilled in the art, by which the other software components of Composition Studio 120 may create visual elements such as text, lines, polygons, animations, and so forth. The use of programming technology such as Adobe Air, supporting both service and application execution modes as described in the context of FIG. 1, is a significant aspect of User Interface Support Module 202. This allows the remainder of the modules in Composition Studio 120 to ignore the execution mode and the details of producing graphics, whether directly on an attached screen in application execution mode, or via a markup language and network protocol as in service execution mode. Those skilled in the art will notice that Network Communication Support Module 201 and User Interface Support Module 202 are but a subset of the capabilities found in typical computer operating system software.

Fundamental to Composition Studio 120, as an environment for creation of Applications 101, is the Visual and XML-Based Representation Language 210. This Visual and XML-Based Representation 210 is the language in which developers will express the logical, structural, temporal, graphical, and other elements of their ideas for an Application 101 or Application Component 102. A visual representation is provided for those, such as Novice Developer 165, who prefer or understand better via such a representation. A formal textual representation, formulated using the well known Extensible Markup Language (XML), is provided both for those, such as Expert Developer 175, who prefer or understand better via such a representation, and for use by the software modules of Composition Studio 120 and its peer subsystems in algorithmically transforming the developer's expressed ideas into a tested Mobile Device Application 101 or Mobile Device Application Component 102.

In the present invention the specific visual representation is a flexible item, evolving over time as developers interact with Composition Studio 120 and provide feedback regarding the effectiveness of Language 210. Similarly, the specific XML-based textual representation is flexible as well, evolving alongside the visual representation and adapting to match it.

To begin, the visual representation part of Language 210 may incorporate elements from several existing visual programming languages, including Scratch, Alice, Mindstorms, LabView, and VPL, as well as potentially novel elements and elements borrowed from unrelated domains. As developer feedback drives tuning of the visual representation, it may incorporate additional elements not present in any of those progenitors. It may also grow to incorporate one or more of elements entirely, or nearly so, as well as other visual representations that are less graphical and more textual, or that use ideation modes not yet conceived, via the Level technique described in the context of FIG. 1. Each Level may be sufficiently complete that it can be used as a semi-independent mode of the visual representation within Language 210, or the various Levels may provide various subsets of the expressive power of Language 210, depending on how the representations evolve as driven by developer feedback and other research.

The XML-based textual representation part of Language 210 is generally readily derivable from the visual representation part by one skilled in the art. It is necessarily mathematically homogeneous and completely lossless with respect to the totality of the visual representation, such that any visually expressed configuration of ideas can be captured entirely in the XML-based representation, stored during a hiatus of the Composition Studio 120 by the developer, and subsequently reproduced exactly upon restoration, through any number of such cycles. In addition, the detailed elements of the XML-based textual representation part of Language 210 are to a large degree independent, for any particular concept, of the specific visual representation that a particular developer may prefer for that particular concept, except to the extent that it may also identify exactly which specific visual representation is being used. This allows a developer to switch between one Level and another if desired, using the different visual representations to express the same ideas without loss of generality. The detailed elements of the XML-based textual representation part of Language 210 also enables and simplifies the various algorithmic transformations which are needed to turn the developer's expression into a running Application 101 and which are embodied in various modules throughout Application Factory System 100.

Thus, Visual and XML-Based Representation Language 210 underlies and interlaces all the modules of Composition Studio, as the general form in which are expressed all the various aspects of any Mobile Device Application 101 or Mobile Device Application Component 102.

To enable the expression of a developer's ideas using Language 210, Composition Studio 120 incorporates Visual Programming Design Toolkit 220 and Multimedia User Interface (UI) Design Toolkit 230 as major modules. Each of these modules supports placement of elements from various palettes onto a corresponding canvas, following a metaphor derived from the practice of art, and used widely in computer software applications intended for expression of various types of creative ideas due to its simplicity and culturally independent comprehensibility.

Within Visual Programming Design Toolkit 220, Data and Logic Canvas 229 offers a multidimensional placeholder for the expression of data, data flows, data manipulation logic, events, event response logic, and other related aspects of a particular Application 101 or Application Component 102 under development. Data and Logic Canvas 229 may be configured to appear as a single workspace, or as multiple linked workspaces, according to the needs and preferences of the particular developer as well as the complexity of the ideas being expressed. Elements may be arranged within the workspaces of Canvas 229 to form scripts that specify behavior, layouts that specify data structure, networks that specify data flow, and so forth as will be readily apparent to those skilled in the art. Formalized advanced concepts, such as entity relationship diagrams, state transition diagrams, message sequence charts, and others, may be incorporated as well. These more advanced elements would be associated with the higher of the Levels, or the additional separately-enabled feature sets, previously described, such that Level 0 presents primarily the most basic of elements suitable for Novice Developer 165.

In general, specific logic and data elements are dragged onto Canvas 229 from various palettes, and then specific attributes are established through controls such as menus, buttons, and pointer gestures. For example, upon dragging a graphical icon representing a control loop logic element onto Canvas 229, the developer may click the pointer on a box in the icon and then type digits indicating the number of times to repeat the loop. The developer may then drag additional logic elements onto the control loop logic element to establish the behavior to execute repeatedly inside the loop. As another example, the developer may drag a graphical icon representing a data input source such as a keyboard onto Canvas 229, followed by another graphical icon representing a data output destination such as a Short Message Service (SMS) recipient. The developer might then click the pointer in a box on the SMS icon, then type a phone number to identify the destination of a message. The developer might further click the pointer on an outward-directed arrow icon within the keyboard icon, drag the pointer over to an inward-directed arrow on the SMS icon, and release the pointer, thereby expressing that what the end user of this Application 101 types will be sent to via SMS to the destination. These are but two examples, but it will be plain to those skilled in the art that innumerable expressions would be possible using various combinations of elements on such a Canvas 229.

The elements that may be placed on Data and Logic Canvas 229 come from a variety of palettes within Visual Programming Design Toolkit 220. Event Palette 221 offers icons representing asynchronous occurrences such as, without limitation, application activation and shutdown or key presses, as well as programmable event-generating elements such as menus and buttons, any of which can be used as script starting points. Logic Palette 222 offers icons representing control structures such as, without limitation, the well known IF/THEN/ELSE, DO/WHILE, FOR/DO, and SELECT, as well as commands such as DISPLAY SCREEN or STOP/EXIT. Data Palette 223 offers icons representing data structures such as, without limitation, numbers, character strings, lists, arrays, and compound objects. Data Palette 223 may also offer tools supporting the advanced elements described above, such as flow and relationship connectors. Math Palette 224 offers icons representing mathematical operations, such as, without limitation, the usual arithmetic operators found on a calculator, Boolean operators, and complex functions such as might be seen in a standard spreadsheet program. Finally, Service Palette 225 offers icons representing specific features of a mobile device, such as its communication and sensing capabilities. In a sense, Service Palette 225 embodies visually what would in a traditional programming environment be called the Application Programming Interface (API) for specific device functions. Example elements to be found in Service Palette 225, representing capabilities typically available in most mobile devices, include without limitation, communication channel tools that provide access to information transfer services such as SMS and MMS, E-mail, RSS, Telephony, Wifi and Bluetooth links, various Instant Messenger (IM) and Voice over Internet Protocol (VoIP) clients such as GTalk or Skype, and various complex clients for social network services such as Facebook or Twitter; location information tools such as a GPS receiver or location sensor, an accelerometer or motion sensor, and interactive map databases; time and date tools such as a clock, a calendar, and various alarms; and information/productivity tools such as a memo pad or personal note composer and database, a sketch pad or personal drawing composer and database, an address book or contact list database, an agenda or personal calendar event database, and a conversation record or message composer and database. Specific functions and data offered by each of the Service Palette 225 elements listed above is dependent on the service provided, but will be readily evident to one skilled in the art upon reflection, investigation of the cited services, and examination of typical feature sets found in devices on the market today.

Within Multimedia UI Design Toolkit 230, Multimedia UI Canvas 239 offers a multidimensional placeholder for the expression of screen presentations, audio input and output, text input and output, and other related user interaction aspects of a particular Application 101 or Application Component 102 under development. Multimedia UI Canvas 239 may be configured to appear as a single workspace, or as multiple linked workspaces, according to the needs and preferences of the particular developer as well as the complexity of the ideas being expressed. Elements may be arranged within the workspaces of Canvas 239 to form screen layouts, animations, and so forth as will be readily apparent to those skilled in the art.

In general, specific user interaction elements are dragged onto Canvas 239 from various palettes, and then specific attributes are established through controls such as menus, buttons, and pointer gestures. For example, upon dragging a graphical icon representing a new screen element onto Canvas 239, the developer may then drag additional graphic elements onto the screen element to establish the visual content of that screen, and use a menu to assign an animation behavior to one or more of the graphic objects on that screen. This is but one example, but it will be plain to those skilled in the art that innumerable expressions would be possible using various combinations of elements on such a Canvas 239.

The elements that may be placed on Multimedia UI Canvas 239 come from a variety of palettes within Multimedia UI Design Toolkit 230. Graphic Palette 231 offers icons representing graphic objects to be drawn on the Canvas 239, such as, without limitation, line segments, polygons, complex predefined shapes, and freehand shapes. Widget Palette 232 offers icons representing information input and output, including without limitation buttons, text boxes, list boxes, drop-down lists, and so forth. Audio/Video Palette 233 offers icons representing sounds, movies, photos, or other audible and visible entities that may be detected (input) or played (output), and tools for manipulating or altering such items that may be produced or encountered within an Application 101. Examples of manipulation or alteration elements that may be offered on Audio/Video Palette 233 include, without limitation, a speech recognition capability or speech to text translator, and a text reading capability or text to speech translator. Haptic Palette 234 offers icons representing mechanical vibrations, feedback forces, or gestures that may be detected or played, and tools for manipulating or altering such items that may be produced or encountered within an Application 101.

As previously mentioned in the context of FIG. 1, a developer may choose to target a Specific Mobile Device Model 104 for a particular Application 101 or Application Component 102, rather than developing for the Generic Mobile Device Model 103. This choice is expressed in Composition Studio 120 through Specific Mobile Device Selector 214. In a preferred embodiment, Specific Mobile Device Selection 214 may present to the developer a list of supported Specific Mobile Device Models 104, which may include both individual devices and device families or brands, and allow one or more to be selected. When a Specific Mobile Device Model 104 is selected as the target for a particular development project for a particular Application 101 or Application Component 102, the items available in the various Palettes of Toolkits 220 and 230 are constrained such that primarily those pertinent to features present in the Specific Mobile Device Model 104 selected via Specific Mobile Device Selector 214 may be used. For example, if a selected Specific Mobile Device Model 104 does not have a motion sensor or accelerometer, the corresponding capabilities would be disabled or not even visible within Service Palette 225. Similarly, if a selected Specific Mobile Device Model 104 does not have the ability to apply vibrations or force feedback in response to touch-screen events, the corresponding capabilities would be disabled or invisible within Haptic Palette 234. Other constraints will be readily evident, following from this principle, to one skilled in the art.

Visual Programming Design Toolkit 220 and Multimedia UI Design Toolkit 230 are interconnected within Composition Studio 120 such that elements assigned to the Canvas of one may have related manifestations in the Canvas of the other. For example, if a new screen element is created within Multimedia UI Canvas 239, it will become possible for the DISPLAY SCREEN command in Logic Palette 222 to identify the new screen element as the one to be displayed. If a programmable button element is created on Data and Logic Canvas 229, it will become possible to link it with a graphic element on a screen on Multimedia UI Canvas 239, such that when an end user of the corresponding Application 101 points at that area of the that screen, the programmed event is triggered. More complex examples can be constructed using the capabilities of Composition Studio 120, as will be readily apparent to those skilled in the art.

In a preferred embodiment, all palettes within both Design Toolkits 220 and 230 are designed to be extensible so that elements can be added and changed easily as the Language 210 evolves. The specific elements presented in each palette may also be filtered, or have complex parameters set to reasonable and perhaps unchangeable defaults, according to the programming Level in which the Composition Studio 120 is operating at any particular moment. New palettes may be defined as well. Further, each palette can be extended to incorporate Application Components 102, and even embeddable Applications 101, of the corresponding semantic class. Design Toolkits 220 and 230 may discover automatically, or support developers in their interactive discovery of, Application Components 102 and embeddable Applications 101 that are available in Distribution Center 130. Distribution Center Library Client 215 provides the mechanism implementing the Composition Studio 120 end of Service Interaction 132 with Distribution Center 130, in support of this capability.

Default palette elements, as well as discovered Application Components 102 and embeddable Applications 101 retrieved from Distribution Center 130 by Distribution Center Library Client 215, are cached within local repositories at Composition Studio 120 for use by Design Toolkits 220 and 230. Default multimedia elements and semantically related Application Components 102 are kept in UI Object Library Cache 213. Default logic and data elements, including event, math, and service elements, and semantically related Application Components 102, are kept in Service Object Library Cache 212. Applications 101 that can be incorporate whole into other Applications 101, or which include pieces which may be incorporated separately from the whole, are kept in Embeddable App Library Cache 211. In a preferred embodiment, Library Caches 211, 212, and 213 are implemented as separate database instances of identical structure for simplicity.

When a developer has expressed enough ideas to form something usable as a mobile application or mobile application component, it should be tested using the capabilities of Visual Verification Toolkit 240. The elements on Data and Logic Canvas 229 can be executed, and the elements on Multimedia UI Canvas 239 can be presented, individually or together as a whole according to the preferences and needs of the developer, in a high fidelity simulation environment essentially identical to that which will exist on any target Mobile Device 181 or 191.

Locally within Composition Studio 120, Visual Verification Toolkit 240 provides testing in the environment of the Generic Mobile Device Model 103. The portion of Generic Mobile Device Model 103 that is relevant for testing, in particular the runtime executive but not the compilation tools, is incorporated in Visual Verification Toolkit 240 as Generic Mobile Device Model Testing Module 241. In addition, so that the developer may interactively observe the execution of expressed elements, two additional modules are desirable.

Generic Mobile Device Interface Simulator 242 provides linkages between physical devices on the developer's Computer 160 or 170, and logical devices of Generic Mobile Device Model Testing Module 241. For example, Computers 160 and 170 are likely to have a microphone and speakers, perhaps a camera, and certainly a screen and keyboard. Interface Simulator 242 links these devices with corresponding devices in the Generic Model Testing Module 241. Most Computers 160 and 170 are likely to be able to play arbitrary sound files and video files as well, allowing Interface Simulator 242 to superimpose those media streams on corresponding simulated inputs and outputs as appropriate for testing, or in place of corresponding real input or output devices. Most Computers 160 and 170 will have a touchpad or a mouse, either of which can be mapped by Interface Simulator 242 onto a touchpad of Generic Model Testing Module 241. Some Computers 160 or 170 may have a multitouch pad or screen, which Interface Simulator 242 can map onto a multitouch pad of Generic Model Testing Module 241. Most Computers 160 and 170 will have Internet connections, and many will have access to Internet-based email, instant messaging, and voice calling services. Interface Simulator 242 can map these services onto wireless communication links and corresponding communication service interfaces within Generic Model Testing Module 241.

Generic Mobile Device Capability Simulator 243 provides simulations of certain Generic Mobile Device Model Testing Module 241 capabilities that would not normally be available on any Computer 160 or 170. For example, the GPS receiver and accelerometer of many real mobile devices, which are modeled in Generic Model Testing Module 241, have no physical counterpart on the typical Computer 160 or 170. Therefore, Capability Simulator 243 may provide a visual simulation of location, whereby an icon representing the modeled mobile device is shown superimposed on a map at a developer-selected location, and Generic Model Testing Module 241 is given inputs such that its simulated GPS receiver reports the selected location to logic and data elements using it. The developer may click on the device icon and drag it to a new location, or select a mode in which the simulated device is propagated along a selected path at a particular velocity, and the simulated GPS receiver will report, again to those logic and data elements using it, the location as it changes while moving. Similarly, a fine-scale motion simulation may be provided by Capability Simulator 243, whereby the developer may select a mode similar to a three-dimensional fly-around display in which the simulated device may be shaken or placed in different orientations by clicking and moving the mouse of Computer 160 or 170. In this mode, the simulated accelerometer in Generic Model Testing Module 241 will report, to those logic and data elements using it, corresponding fine motion changes.

In some situations, the developer will not be satisfied with testing against only the Generic Mobile Device Model Testing Module 241. If an Application 101 under development relies upon unique features of a Specific Mobile Device Model 104, or if for any reason the developer wishes to be absolutely certain of the behavior on a particular model, Visual Verification Toolkit 241 has the ability to access any and all Specific Mobile Device Models 104 for testing. This is accomplished by utilizing Verification Engine 150 through Verification Engine Client 245, which implements the Composition Studio 120 end of Service Interaction 152. Noting that Verification Engine 150 may also be incorporated into Composition Studio 120 via Embedment 125 when operating in application execution mode, it is also possible for Visual Verification Toolkit 240 to interact with the developer's own real Mobile Device 191 for testing purposes. In either case, prior to executing the Application 101 under development on a real Mobile Device 191 or Specific Mobile Device Model 104, it will be desirable to compile the expressed design into an actual executable suitable for the target. This is accomplished by Build Engine 140, through Build Engine Client 244, which implements the Composition Studio 120 end of Service Interaction 142.

In general, a complete and tested Application 101 or Application Component 102 may be submitted to Distribution Center 130 for consideration. Distribution Center Submission Client 216 provides the ability to do so, implementing the submission aspects of the Composition Studio 120 end of Service Interaction 132. Relevant aspects include, without limitation, identifying and transmitting the submitted Application 101, identifying the submitting developer as a specific user of Distribution Center 130, and setting a price (which may be zero) for others to use it.

A thorough developer will generally build and test the completed Application 101 or Application Component 102 on multiple real Mobile Devices 191 or Specific Mobile Device Models 104. To ease this process, Build Engine Client 244 and Verification Engine Client 245 provide the ability to submit the Application 101 or Application Component 102, as expressed in Language 210, to Build Engine 140 for builds on multiple Specific Mobile Device Models 104, and then to Verification Engine 150 for automatic verification using a detailed test plan on multiple, or even all, Specific Mobile Device Models 104. More information on these bulk build and verification modes is provided in the descriptions of FIGS. 4 and 5, respectively.

Figure 6:
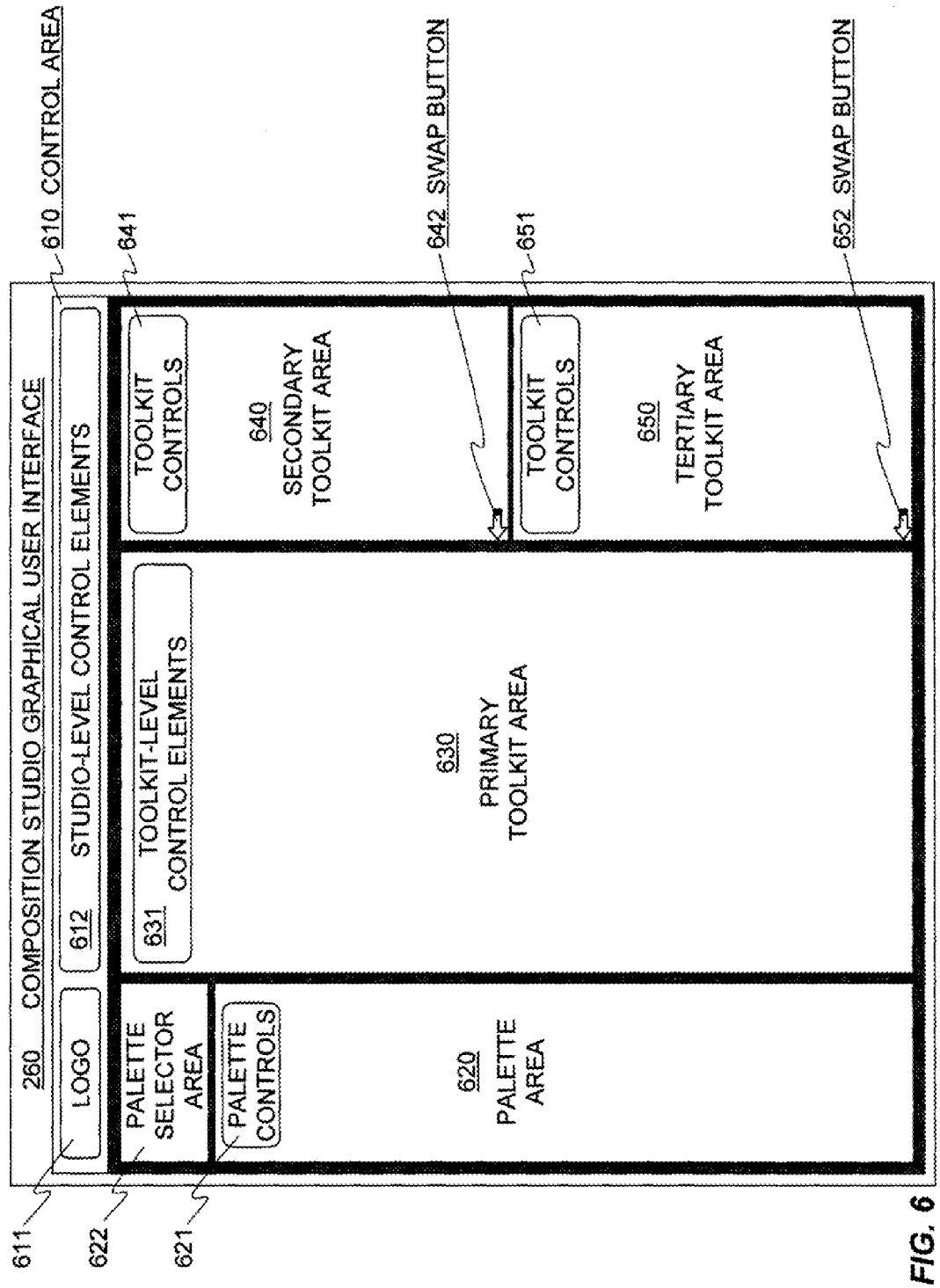
FIG. 6 illustrates an exemplary graphical user interface presented by a preferred embodiment of the Mobile Application Composition Studio in accordance with the present invention.

Tying together all the user-facing functionality of Composition Studio 120 is Graphical User Interface 260. This is a design module that provides graphical and interactional support for each of the functions already described. It is implemented, using techniques well known to those skilled in the art, in a manner that integrates with the functional modules and relies upon the features of User Interface Support Module 202. An example layout that may be used for User Interface 260 in a preferred embodiment of the present invention is shown in FIG. 6.

FIG. 3 depicts Mobile Application Distribution Center 130 in more detail, showing the major functional modules that embody the functionality outlined in the FIG. 1 description. As in FIG. 1, the significant external interfaces and corresponding cooperating elements outside Distribution Center 130 are also shown. The Composition Studio 120, Build Engine 140, Verification Engine 150, Service Interactions 132, 143, and 153, Internet Customer's Computer 180 and Network Connection 183, Internet Customer's Mobile Device 180, Mobile Customer's Mobile Device 191, Network Connection 193, and Embedment 139, and Application Downloads 108 and 109 shown in FIG. 3 are substantially as already described in the context of FIG. 1.

Starting at the bottom of the diagram are fundamental modules typically found in any modern software program. Network Communication Support Module 301 provides connectivity with other subsystems of Application Factory System 100, and contains such common and well known components as an inter-process message-passing software bus, message structure parsing toolkits, a TCP/IP protocol stack implementation, and networking hardware drivers appropriate for the computer hardware on which Distribution Center 130 runs. User Interface Support Module 302 provides tools for presenting information visually to a user of Distribution Center 130, such as Internet Customer 185 or Mobile Customer 195. In a preferred embodiment, User Interface Support Module 302 takes the form of a portable and generic application programming interface (API), well known to those skilled in the art, by which the other software components of Distribution Center 130 may create visual elements such as text, lines, polygons, animations, and so forth. The use of programming technology such as Adobe Air, supporting both the web service implementation and the mobile application embedment implementation of the user interface as described in the context of FIG. 1, is a significant aspect of User Interface Support Module 302. This allows the remainder of the modules in Distribution Center 130 to ignore the execution site of User Interface Support Module 302 and the details of producing graphics, whether directly on an attached screen in the mobile application embedment implementation, or via a markup language and network protocol as in the web service implementation. Those skilled in the art will notice that Network Communication Support Module 301 and User Interface Support Module 302 are but a subset of the capabilities found in typical computer operating system software. Though important in that Distribution Center 130 could not exist at all without them, the bulk of operating system functionality is left unshown and implicit to the implementation because it does not differentiate any novel aspects of the present invention.

At the next layer of abstraction up the functional stack of Distribution Center 130, User Database Module 303 provides the fundamental representation and storage of profile information for customers, including those similar to Internet Customer 185 and those similar to Mobile Customer 195, as well as developers including those similar to Novice Developer 165 and those similar to Expert Developer 175. In a preferred embodiment, User Database Module 303 is implemented as a specialization of an off-the-shelf database system, such as the popular open source database MySQL.

Another fundamental middleware module of Distribution Center 130 is Web Application Server 304. This module provides the environment in which the major functional elements execute, providing transparent session management, high performance multiprocessing, and high availability services. In a preferred embodiment, Web Application Server 304 is implemented as a specialization of an off-the-shelf web server system, such as the popular open source web application suite often referred to as LAMP, comprising Apache coupled with MySQL and PHP, all running on Linux.

At the core of Distribution Center 130 in its role as an "app store" is the ability to store Applications 101, Application Components 102, and information or metadata about each one. Library Services module 310 embodies this set of functions. Search Toolkit 311 offers users the ability to browse and search for specific items in the various repositories, using various attributes of the stored items as search keys. App (application) Repository 312 stores all the Mobile Device Applications 101 that are present in Distribution Center 130, including those that are embeddable in other Applications 101 by developers using Composition Studio 120. SO (service object) Repository 313 stores all the Mobile Device Application Components 102 which represent complex device functionality suitable for use in the Visual Programming Design Toolkit 220 of Composition Studio 120, and which are known as service objects or SOs. UO (user interface object) Repository 314 stores all the Mobile Device Application Components 102 which represent multimedia user interface functionality suitable for use in the Multimedia UI Design Toolkit 230 of Composition Studio 120, and which are known as user interface objects or UOs. In a preferred embodiment, Repositories 312, 313, and 314 may be implemented as separate database instances of identical structure, or as a single database instance containing all three repositories, for simplicity. Also in a preferred embodiment, Library Services module 310 is implemented as a specialization of the file management feature set of an off-the-shelf web-services content management system (CMS), such as the popular open source social networking and publishing platform Elgg.

Also central to the "app store" role of Distribution Center 130 is On-Demand Download Service 320. This module provides functions associated with acquiring an item stored in Library Services module 310. When a customer selects a particular Application 101 for acquisition and download to a Mobile Device 181 or 191, which is of a supported Specific Mobile Device Model 104, On-Demand Download Service 320 may determine which Specific Mobile Device Model 104 is desired. Specific Mobile Device Selector 321 makes this determination by looking in the customer's user profile as stored in User Database Module 303. If the information is not there, Specific Mobile Device Selector 321 prompts the customer for this information by presenting a menu of supported Specific Mobile Device Models 104. In the special case of the mobile application embedment implementation, Selector 321 may also query User Interface Support Module 302 for information about the Mobile Device 191 in which it is running, and mapping that information to the Specific Mobile Device Model 104. For example, the International Mobile Equipment Identifier (IMEI) generally identifies the manufacturer and model code of Mobile Device 191, and the software version string generally provides enough information to identify the exact operating system release. Together, these codes may be used to select the correct Specific Mobile Device Model 104 desired for the requested acquisition and download. Selector 321 may also, upon discovering the customer's Specific Mobile Device Model 104, record it in the customer's profile via User Database Module 303.

With the pertinent Specific Mobile Device Model 104 known, On-Demand Download Service 320 next determines whether a compatible executable version of the selected Application 101 exists in Distribution Center 130, submitting a query for that information to App Repository 312 via Search Toolkit 310. If no such version exists, Download Service 320 creates one by submitting the source code of Application 101 as expressed in Language 210 to Build Engine 140 via Build Engine Client 322, which implements the Distribution Center 130 end of Service Interaction 143. Upon receipt at Build Engine Client 322 of the executable Application 101 version as compiled for the selected Specific Mobile Device Model 104, Download Service 320 stores it in App Repository 312.

With the desired executable Application 101 version in hand, Download Service 320 examines the price of Application 101 as stored in the metadata that accompanies it in App Repository 312. If the price of Application 101 is not zero, Download Service 320 may enter E-Commerce Engine 323 to take payment. Payment arrangements may be stored in the customer's profile at User Database Module 303, or collected at purchase time via customer input. E-Commerce Engine 323 is responsible for making the corresponding determinations, collecting the necessary information, and interacting with external payment clearinghouses such as credit card networks and PayPal, via standard interfaces not shown in FIG. 3 as they are well known to those skilled in the art. E-Commerce Engine 323 is also responsible for allocating the proceeds of the customer's purchase to the various parties owed money in the transaction. These include, without limitation, the developer of the delivered Application 101, along with the developers of any Application Components 102 and embedded Applications 101 incorporated within the delivered Application 101 and licensed on a per-instance basis, as well as the proprietor of Distribution Center 130 and, if such business arrangements exist, the proprietors of other facilities used during the transaction such as Network Connection 193.

Finally, Mobile Device OTA (Over The Air) Delivery Module 324 provides the procedures and interfaces desirable to execute Application Download 109, thereby pushing the acquired Application 101 executable out to Mobile Device 191 over Network Connection 193. Alternatively, in the event the destination is an Internet Customer's Mobile Device 181, OTA Delivery Module 324 may execute Application Download 108, thereby pushing the acquired Application 101 executable out to Internet Customer's Computer 180 over Network Connection 183, from whence Internet Customer 185 (shown in FIG. 1 but omitted from FIG. 3 due to space constraints) would be responsible for the further movement of Application 101 into Mobile Device 181. In general, OTA Delivery Module 324 may be cognizant of different protocols for each Specific Mobile Device Model 104, and would select the correct one to use for each download transaction.

Where Library Services 310 and Download Service 320 are concerned with storing, finding, and delivering Applications 101, the problem of educating customers about Applications 101 has not yet been addressed fully. While descriptive metadata, associated with each Application 101 and available in Repository 312, are useful and informative, they are static and alone would be considered incomplete by today's standards of online product information. Distribution Center 130 therefore provides an additional means of self-education and, as has become typical of online marketplaces, a cooperative means of mutual peer education among customers.

Mobile Application Demonstrator 330 provides the additional means of self education by offering a mechanism whereby customers may interact with Applications 101 in live simulations of the Generic Mobile Device Model 103 and Specific Mobile Device Models 104. Demonstrator 330 is similar in many respects to the simulation environment provided by Visual Verification Toolkit 240, and is implemented using identical technical capabilities except that it is constrained to presenting each Application 101 whole. By default, Demonstrator 330 offers Generic Mobile Device Model Demonstrator 331, which is the demonstration-only subset of Generic Mobile Device Model 103. At the request of a customer, Demonstrator 330 may also offer Specific Mobile Device Selector and Simulators 332, which allows the customer to choose which Specific Mobile Device Model 104 to simulate while demonstrating Application 101.

Cooperative education among customers is supported by User Interaction Services module 340. Various toolkits provide customer to customer, customer to developer, and developer to developer connections and information flows patterned after models that have become typical of modern, so-called "Web 2.0" services. Social Networking Toolkit 341 offers the typical capabilities related to forming and presenting an online persona, such as profile information collection and avatars, as well as forming and recording connections among friends and acquaintances, thereby allowing customers and developers to keep one another apprised of what Applications 101 and Application Components 102 they are using, as well as sharing what they think of each one. Reputation Toolkit 342 offers the ability to collect, present, and track customer and developer reviews, opinions, and ratings of Applications 101, Application Components 102, and one another. Communication Toolkit 343 offers such communication media as blogs, forums, private messages, groups messages, public messages, and so forth. Those skilled in the art will readily identify additional features not named here that would typically be, and in the preferred embodiment of the present invention are, included in the toolkits of User Interaction Services module 340. In addition, User Interaction Services module 340 may offer features that are built upon a combination of its component toolkits' capabilities. For example, User Interaction Services module 340 may provide a feature that permits a customer to post a request, either openly or directed to a specific developer, for development of an Application 101 with particular attributes as described by the customer. User Interaction Services module 340 may also provide a corresponding feature that permits a developer to identify an Application 101 as being submitted in response to such a customer request, and which in turn notifies the requesting customer that the requested Application 101 has become available. In a preferred embodiment, User Interaction Services module 340 is implemented as a specialization of an off-the shelf web-services content management system (CMS) such as the popular open source social networking and publishing platform Elgg.

Astute readers will have noticed that both Library Services module 310 and User Interaction Services module 340 are built upon the Elgg platform in a preferred embodiment. While not previously mentioned, Download Service 320 and Demonstrator 330 may also be integrated with the Elgg platform via plug-ins in a preferred embodiment. Sharing the platform in this manner enables various synergies to arise. For example, when two customers identify one another as friends via Social Networking Toolkit 341, they may exchange opinions, tracked by Reputation Toolkit 342, about a group of Applications 101. If one of the friends expresses a favorable view of one Application 101 in the group, while the other has not used it, the first may choose to send a copy to the second via Download Service 320. E-Commerce Engine 323 may be configured in this situation to charge the sender instead of the recipient, and to charge a discounted price as a reward for the favorable opinion. Alternatively, E-Commerce Engine 323 may be configured in this situation to charge full price to the recipient, after recipient has received and used Application 101 for a certain period of time and agrees to keep it, and distribute a portion of the payment to the sender as a reward for the favorable opinion and a commission on the subsequent sale. In another example scenario, if a customer is trying out an Application 101 in Demonstrator 330, and if the developer of Application 101 happens to be logged into Distribution Center 130 at the same time, Communication Toolkit 343 may detect this coincidence and offer both customer and developer the option to communicate directly, allowing the customer to ask questions that the developer may answer, and collecting those exchanges automatically into a Frequently Asked Questions file associated with either the Application 101 or the developer's public profile depending on context and content. Some such synergetic examples will be readily apparent to those skilled in the art, while others that are not obvious may become the subject of subsequent inventions.

The aspects of Distribution Center 130 so far described have been focused upon the services it provides to external users which exist outside Application Factory System 100. Service Interaction 132, whereby Composition Studio 120 accesses the services of Distribution Center 130, is handled by Distribution Service 350, which acts as the counterpart within Distribution Center 130 to Distribution Center Clients 215 and 216 within Composition Studio 120, connecting developers to the capabilities of Distribution Center 130 while using Composition Studio 120. In particular, Composer Submission Service Module 351 connects to Distribution Center Submission Client 216, thereby allowing developers to submit, edit metadata, and establish prices for Applications 101 and Application Components 102. Library Access Service Module 352 connects to Distribution Center Library Client 215, thereby allowing developers to access Library Services 310, including the entirety of Repositories 312, 313, and 314. Distribution Service 350 also provides the ability for all of Distribution Center 130 to embed itself in Composition Studio 120 via Service Interaction 132, allowing developers to participate in developer-oriented features of User Interaction Services 340 and access developer-specific business information captured by Download Service 320. For example, through Service Interaction 132 developers would be able to communicate with customers, receive advice from and offer advice to other developers, track opinions and ratings and sales statistics of the developer's Applications 101 and Application Components 102, and provide direction regarding disposition of payments received by purchasers of the developer's Applications 101 and Application Components 102. Finally, Distribution Service 350 also incorporates a Verification Engine Client 353, which handles the Distribution Center 130 end of Service Interaction 153 with Verification Engine 150, thereby enabling Distribution Service 350 to ensure submitted Applications 101 and Application Components 102 are tested thoroughly and do not perform damaging behaviors prior to including Applications 101 and Application Components 102 in the appropriate Repository 312, 313, or 314.

Tying together all the user-facing functionality of Distribution Center 130 is Graphical User Interface 370. This is a design module that provides graphical and interactional support for each of the functions already described. The Distribution Center 130 is implemented, using techniques well known to those skilled in the art, in a manner that integrates with the functional modules and relies upon the features of User Interface Support Module 302. In a preferred embodiment, the layout of Graphical User Interface 370 will vary dynamically according to the preferences of customers and developers, and may in general resemble a combination of the features typically found in social networking, app store, and development project support systems that are in common use.

FIG. 4 depicts Mobile Application Build Engine 140 in more detail, showing the major functional modules that embody the functionality outlined in the FIG. 1 description. As in FIG. 1, the significant external interfaces and corresponding cooperating elements outside Build Engine 140 are also shown. The Composition Studio 120, Distribution Center 130, Verification Engine 150, Service Interactions 142, 143, and 154, and Embedment 124 shown in FIG. 4 are substantially as already described in the context of FIG. 1.

Starting at the bottom of the diagram are fundamental modules typically found in any modern server software program. Network Communication Support Module 401 provides connectivity with other subsystems of Application Factory System 100, and contains such common and well known components as an inter-process message-passing software bus, message structure parsing toolkits, a TCP/IP protocol stack implementation, and networking hardware drivers appropriate for the computer hardware on which Build Engine 140 runs. As a background service, Build Engine 140 does not have a user interface support module comparable to those in Composition Studio 120 and Distribution Center 130. Instead, Build Engine 140 incorporates a Computation Resource Management Module 402 that provides tools for scheduling compilation transactions across the available computing resources. This module is essential for the service execution mode, in which Build Engine 140 is shared among potentially a very large number of simultaneous transactions on behalf of Composition Studio 120 and Distribution Center 130. Computation Resource Management Module 402 is also somewhat useful for the application execution mode, in which Build Engine 140 coexists with user-facing interactive tasks as part of Composition Studio 120. In either case, the computation intensity required for an individual compilation transaction is very high, necessitating the resource management capability. Those skilled in the art will notice that Network Communication Support Module 401 and Computation Resource Management Module 402 are but a subset of the capabilities found in typical computer operating system software. Though important in that Build Engine 140 could not exist at all without them, the bulk of operating system functionality is left unshown and implicit to the implementation because it does not differentiate any novel aspects of the present invention.

As a background service, the fundamental module of Build Engine 140 is the Build Service 420, which orchestrates compilation transactions requested by other subsystems of Application Factory System 100. Within Build Service module 420, Service Responder Module 421 is responsible for receiving compilation requests from Build Engine Client 322 of Distribution Center 130 and Build Engine Client 244 of Compilation Studio 120 via Service Interactions 143 and 142, respectively, and returning results to them. In certain circumstances, such as the inclusion within the requested compilation of references to embedded Applications 101 or Application Components 102, Distribution Center Library Client Module 422 is responsible for retrieving the appropriate compilable or linkable versions of the referenced items from Distribution Center 130, specifically Library Access Service Module 352, via Service Interaction 143. Build Service module 420 also incorporates a Verification Engine Client 423, which is a substantially identical copy of Verification Engine Clients 353 and 245 in Distribution Center 130 and Composition Studio 120, respectively, for the purpose of submitting a compiled Application 101 to Verification Engine 150, via Service Interaction 154, so that it can be tested for inappropriate or malicious behavior prior to returning it to the requesting Build Engine Client 322 or 244. Thus, Build Service module 420 handles the Build Engine 140 end of all three Service Interactions 142, 143, and 154 with Composition Studio 120, Distribution Center 130, and Verification Engine 150, respectively.

A compilation request submitted to Build Engine 140 may contain one or more objects to be compiled. Each object is the expression of an Application 101 or Application Component 102, produced with the aid of Composition Studio 120. Once any additional objects referenced by the expression but not included in the request as submitted are retrieved by Build Service 420 using Library Client 422 as described above, the entire group forms a Compilation Set 411 comprising Service Objects, UI Objects, and Application expressions. This unit of compilation can then be handled by Service Adaptation Framework 430 as part of turning it into an executable Application 101 or linkable Application Component 102.

At the heart of Build Engine 140, Service Adaptation Framework 430 embodies the fundamental algorithms that transform a portable expression from Composition Studio 120 into source code targeting a Specific Mobile Device Model 104. Each module of Service Adaptation Framework 430 provides a desired step in, or an abstraction effectuating, that transformation. The following paragraphs describe each of those modules in turn.

Visual and XML-Based Representation Language 431 is an abstraction that defines the syntax and semantics of expressions produced by Composition Studio 120. The Visual and XML-Based Representation Language 431 is substantially identical to that subsystem's Visual and XML-Based Representation Language 210, except that here the visual aspect is present but not relevant to the compilation transaction. That is, only the XML-based textual representation is used in transforming Compilation Set 411.

The semantics of the expressed Application 101 or Application Component 102 as it emerges from Composition Studio 120 exist in the context of Generic Mobile Device Model 103. For compilation, the expression may be combined with common code associated with Generic Mobile Device Model 103, as embodied in the Generic Mobile Device Model Build Toolkit 432 abstraction. For one skilled in the art, this abstraction can be considered as being analogous to a middleware package and API that present a uniform syntax and semantic for services defined differently by every hardware and operating system software platform. During the compilation transaction, then, Service Adaptation Framework 430 adds the Build Toolkit 432 middleware to Compilation Set 411, and runs the combination through XML-Based Representation Language Interpreter 433.

Interpreter 433 is responsible for parsing each expression in the combined Compilation Set 411 and Build Toolkit 432 middleware, driving its translation using syntactic analysis and compiler techniques well known to those skilled in the art, in conjunction with a Target Device-Specific Language Code Generator 435 selected by Specific Mobile Device Selector 434, which identifies the target Specific Mobile Device Model 104 and chooses the appropriate translator from among all Target Device-Specific Language Code Generators 435. Together, Interpreter 433 and Code Generator 435 produce a new expression of Compilation Set 411 in the form of source code native to the target Specific Mobile Device Model 104. This new expression is in turn combined with Precompiled Component Objects 436 as needed and as available, and run through the compiler and linker associated with target Specific Mobile Device Model 104 selected from Target Device-Specific Software Development Kits and Tool Chains 440. The selected Tool Chain 440 produces a Target Device-Specific Executable 412 that embodies Application 101 for the selected target Specific Mobile Device Model 104. If not already present among Precompiled Component Objects 436, Service Objects and UI Objects that had to be translated and compiled for this transaction are added so they can be used without recompiling in future transactions.

As previously mentioned, Build Service 420 can submit Executable 412 to Verification Engine 150 using Verification Engine Client 423 in order to ascertain whether the embodied Application 101 performs any inappropriate or malicious behaviors in its final form. In a preferred embodiment of the present invention, Build Service 420 may also submit the uncompiled Compilation Set 411 to Verification Engine 150 for the same purpose, prior to beginning translation. Each verification run, both before and after compilation, has the ability to detect different types of inappropriate or malicious behaviors.

Because any given compilation transaction may take the form of a "bulk" build that requests multiple builds corresponding to multiple target Specific Mobile Device Models 104, Build Service 420 may drive each Compilation Set 411 through Service Adaptation Framework 430 and several Tool Chains 440 multiple times, producing a separate Executable 412 each time. All Executables 412 that are produced due to a single request are returned, though not necessarily in a single response; the use of multiple responses facilitates parallelism between Build Engine 140 and the requestor such that Executables 412 that are ready to be handled at the requestor may be.

FIG. 5 depicts Mobile Application Verification Engine 150 in more detail, showing the major functional modules that embody the functionality outlined in the FIG. 1 description. As in FIG. 1, the significant external interfaces and corresponding cooperating elements outside Verification Engine 150 are also shown. The Composition Studio 120, Distribution Center 130, Build Engine 140, Service Interactions 152, 153, and 154, and Embedment 125 shown in FIG. 5 are substantially as already described in the context of FIG. 1.

Starting at the bottom of the diagram are fundamental modules typically found in any modern server software program. Network Communication Support Module 501 provides connectivity with other subsystems of Application Factory System 100, and contains such common and well known components as an inter-process message-passing software bus, message structure parsing toolkits, a TCP/IP protocol stack implementation, and networking hardware drivers appropriate for the computer hardware on which Verification Engine 150 runs. As a background service, Verification Engine 150 does not have a user interface support module comparable to those in Composition Studio 120 and Distribution Center 130. Instead, Verification Engine 150 incorporates a Computation Resource Management Module 502 that provides tools for scheduling verification transactions across the available computing resources. This module is essential for the service execution mode, in which Verification Engine 150 is shared among potentially a very large number of simultaneous transactions on behalf of Composition Studio 120, Distribution Center 130, and Build Engine 140. Computation Resource Management Module 502 is also somewhat useful for the application execution mode, in which Verification Engine 150 coexists with user-facing interactive tasks as part of Composition Studio 120. In either case, the computation intensity required for an individual verification transaction is very high, necessitating the resource management capability. Those skilled in the art will notice that Network Communication Support Module 501 and Computation Resource Management Module 502 are but a subset of the capabilities found in typical computer operating system software. Though important in that Verification Engine 150 could not exist at all without them, the bulk of operating system functionality is left unshown and implicit to the implementation because it does not differentiate any novel aspects of the present invention.

As a background service, the fundamental module of Verification Engine 150 is the Verification Service 560, which orchestrates verification transactions requested by other subsystems of Application Factory System 100. Within Verification Service module 560, Service Responder Module 561 is responsible for receiving verification requests from Verification Engine Client 423 of Build Engine 140, Verification Engine Client 353 of Distribution Center 130, and Verification Engine Client 245 of Compilation Studio 120, via Service Interactions 154, 153, and 152 respectively, and returning results to them. Thus, Verification Service module 560 handles the Verification Engine 150 end of all three Service Interactions 152, 153, and 154 with Composition Studio 120, Distribution Center 130, and Build Engine 140, respectively.

Depending on the requestor and the specific request, Verification Service 560 may operate in either interactive mode or automated mode. Interactive Verification Service 562 exposes Interactive Verification Framework 530 to developers using Composition Studio 120, via Service Interaction 152. This mode is particularly useful when Verification Engine 150 is incorporated directly in Composition Studio 120 via Embedment 125, supporting local testing of Applications 101 and Application Components 102 that are in development. Interactive mode can also be useful when executing as a service, allowing a developer using Composition Studio 120 to access server-side testing capabilities such as simulators or even actual devices for Specific Mobile Device Models 104 that are not included in Composition Studio 120. Automated Verification Service 563 handles true background, and in particular "bulk" or multiple verification requests, and uses primarily Automatic Verification Framework 520 to accomplish its tasks. In either case, Verification Service 560 bundles the request parameters into a data item shown in FIG. 5 as Objects to be Verified 510, which represents the Applications 101 and/or Application Components 102 that are to be processed in any particular verification transaction handled by Service Responder Module 561. Objects to be Verified 510 is in essence an identifier and state placeholder for each verification transaction.

As already mentioned, Interactive Verification Framework 530 is exposed by Interactive Verification Service 562 to developers using Composition Studio 120, in order to support live testing of Objects to be Verified 510 in the context of devices supported by Verification Engine 150. Because it is driven interactively by a human developer, the major function of Interactive Verification Framework 530 is to provide a conduit for user interface inputs and outputs between the developer at Composition Studio 120 and a Specific Mobile Device Model 104 being used for the interactive verification transaction. Test Device Interface module 531 provides this function. In addition, Interactive Verification Framework 530 supports essential testing features such as single-stepping control, capture of execution traces, and perhaps most valuable, capture of developer-driven sequences of inputs and corresponding outputs via Sequence Recorder module 532. Sequences captured by Sequence Recorder 532 may be edited by the developer to create test cases associated with Applications 101 or Application Components 102 in Objects to be Verified 510.

Test sequences captured by Sequence Recorder 532, or created by external means, are held in Test Plan Database 550. This repository stores test cases in a formal language that, for any particular test sequence, provides a specification of the inputs to drive and the outputs to expect at each step. In a preferred embodiment, the test case specification language may be one or more of numerous such languages available in the prior art, including in particular the well known Tool Command Language (Tcl). Test Plan Database 550 also stores test plans as lists of test cases that may be associated with one another due to various factors, such as being part of a usage scenario or exercising a certain class of hardware. The configurations to which a test case or test plan may be applied, and the factors that unite the test cases in a particular test plan, are also held in Test Plan Database 550 as metadata so as to facilitate test sequence selection.

Test Plan Database 550 comprises a number of partitions, each holding a particular subset of the potential universe of test cases and test plans. Included, without limitation, among these partitions are Specific Mobile Device Test Cases 551, which are associated with Specific Mobile Device Models 104; Developer-Supplied Application/Component Tests 552, which are associated with Applications 101 and Application Components 102, and which may have been created externally or captured explicitly by Sequence Recorder 532; and Service Adaptation Framework Tests 553, which are associated with the implementation of Service Adaption Framework 430 and may be applied to any Application 101, Application Component 102, Specific Mobile Device Model 104. Beyond those partitions shown in FIG. 5 and described in the immediate foregoing, a preferred embodiment will provide a mechanism for extending Test Plan Database 550 to include additional partitions.

Where Interactive Verification Framework 530 provides live developer-driven testing, Automatic Verification Framework 520, as its name implies, automatically tests Objects to be Verified 510 against a Specific Mobile Device Model 104, operating in the context of transactions managed by Automatic Verification Service 563 and in response to requests from Verification Engine Clients 245, 353, and 423 in Composition Studio 120, Distribution Center 130, and Build Engine 140 respectively.

Automatic Verification Framework 520 includes, without limitation, a Test Device Interface 523, similar to Test Device Interface 531 of Interactive Verification Framework 530. However, where Test Device Interface 531 acts primarily as a conduit between device and developer, Test Device Interface 521 provides controlled access to well-defined test cases executed automatically by Automatic Verification Framework 520. This difference is subtle but significant: no analysis is required within Interactive Verification Framework 530, while Automatic Verification Framework 520 may select, execute, and analyze the results of test cases. Test Device Interface 523 provides therefore not only the raw user interface data stream but also synchronization services and context information such as timestamps so that Framework 520 may keep the event flow coordinated correctly.

Within Automatic Verification Framework 520, Test Case Execution Driver 521 is responsible for selecting and executing specific test sequences through Test Device Interface 523, while Test Case Success Analyzer 522 is responsible for observing the result of each step in a test sequence to determine whether it is correct. Test Plan Database 550, described earlier, provides the raw material for Driver 521 and Analyzer 522, storing for any particular test sequence a specification of the inputs Driver 521 should execute and the outputs Analyzer 522 should expect at each step. Automatic Verification Framework 520 may select the sequences it will perform for any specific verification transaction by extracting from Test Plan Database 550 all those test cases and test plans associated with any element of the Objects to be Verified 510 for the transaction. That is, sequences in Device Test Cases 551 that are associated with the Specific Mobile Device Models 104 in Objects to be Verified 510, sequences in Application/Component Tests 552 that are associated with Applications 101 or Application Components 102 in Objects to be Verified 510, and sequences in Service Adapation Framework Tests 553 that are common to all Applications 101, Application Components 102, or Specific Mobile Device Models 104, or that are specific to the build process for any of them, may be selected for execution by Automatic Verification Framework 520. In a preferred embodiment, Automatic Verification Framework 520 may execute independent test sequences consecutively or in parallel, depending on the resources available at the time of the transaction and according to the priorities of Computation Resource Management Module 502.

Both Interactive Verification Framework 530 and Automatic Verification Framework 520 exercise one or more devices under test, as requested in Objects to be Verified 510, via their respective Test Device Interfaces 531 and 523. In either case, the device under test is provided by Test Device Library 540, which contains simulations of every Specific Mobile Device Model 104 supported in Application Factory System 100, as well as actual instances of whatever subset of those Specific Mobile Device Models 104 may be economic at a given time in the life of Application Factory System 100.

Within the Test Device Library 540 may be found numerous testable device models. First, Generic Mobile Device Model Simulator 541 provides the executable simulation aspects of Generic Mobile Device Model 103, allowing Verification Engine 150 to support testing of any Application 101 or Application Component 102 in the common-denominator feature set that model represents. Next, Specific Mobile Device Selector 542 offers a mechanism whereby a particular Specific Mobile Device Model 104 may be chosen for testing via one of the Specific Mobile Device Simulators 543 which embody the corresponding executable simulation aspects. In a preferred embodiment, Specific Mobile Device Simulators 543 may be incorporated from the software development tools provided by manufacturers of Specific Mobile Device Models 104, and likely are components of the same toolkits which also provide the compilers and linkers of Target Device Specific Software Development Kits and Tool Chains 440.

Finally, Test Device Library 540 may be configured to access Specific Actual Mobile Devices 544 via dedicated device-specific cabling and driver software. Such access would offer the highest fidelity of device execution during a verification transaction, potentially including actual access to the device's native wireless service. As a physical device, however, this resource would be among the most precious of all in Application Factory System 100, so the proprietor of System 100 may choose to charge a fee for verification transactions that use it. In any case, in a preferred embodiment usage of the resources in Specific Actual Mobile Devices 544 would be carefully managed by Computation Resource Management Module 502.

Turning now to FIG. 6, a user interface is shown for Composition Studio 120. Composition Studio Graphical User Interface (or GUI) 260 expands upon the same element depicted without detail in FIG. 2. GUI 260 presents a screen subdivided into several regions, each representing a specific function of Composition Studio 120. Control Area 610 provides a central grouping for elements that are common to the entirety of Composition Studio 120. Space is allocated for a graphic Logo 611, which would in a preferred embodiment contain a symbol, probably a trademark, identifying the Application Factory System 100, the Composition Studio 120, and possibly their proprietor. Studio-Level Control Elements area 612 allocates space for buttons, menus, and tabs common to the entire Composition Studio 120, including without limitation project information commands, import and export commands, option setting commands, and other similar commands as will be readily apparent to those skilled in the art.

At the center and right side of GUI 260, spaces are allocated for displaying the three major toolkits of Composition Studio 120. Visual Programming Design Toolkit 220 and in particular Data and Logic Canvas 229, Multimedia UI Design Toolkit 230 and in particular Multimedia UI Canvas 239, and Visual Verification Toolkit 240 are, one to each, displayed within the Primary, Secondary, and Tertiary Toolkit Areas 630, 640, and 650. The spaces allocated for Toolkit Areas 630, 640, and 650 are all of roughly the same proportions, or aspect ratio, though of different sizes. The proportions selected and shown in GUI 260 correspond roughly to those of a typical mobile device display screen, such that the developer may perform screen design in Multimedia UI Design Toolkit 230 upon Multimedia UI Canvas 239 using an accurate representation of the target device's screen. Similarly, testing in Visual Verification Toolkit 240 is facilitated by the presentation of the selected device simulator's user interface aspects, whether Generic Mobile Device Interface Simulator 242 or a Specific Mobile Device Simulator 543, again using an accurate representation of the target device's screen. In a preferred embodiment, the actual proportions of Toolkit Areas 630, 640, and 650 may be set to mimic exactly the display screen of a Specific Mobile Device Model 104 as selected by the developer.

Which Toolkit 220, 230, or 240 is displayed in which Toolkit Area 630, 640, or 650 upon initially entering Composition Studio 120 would, in a preferred embodiment, be set according to developer preferences; such preference commands would be found via one of the common controls in Studio-Level Control Elements 612. In order to control which Toolkit 220, 230, or 240 is in each Toolkit Area 630, 640, or 650 at any subsequent time, the two Swap Buttons 642 and 652 are provided. When activated using a pointer device, each Swap Button 642 or 652 causes the Toolkit 220, 230, or 240 currently displayed within the corresponding Toolkit Area 640 or 650 to be displayed instead in the larger Primary Toolkit Area 630, and causes the Toolkit 220, 230, or 240 formerly displayed in Primary Toolkit Area 630 to be displayed instead in the smaller Toolkit Area 640 or 650, respectively according to which of the two Swap Buttons 642 or 652 was activated. Primary Toolkit Area 630 is rather larger than Secondary and Tertiary Toolkit Areas 640 and 650; one skilled in the art would surmise that most of the developer's activities should take place within Primary Toolkit Area 630. While Primary Toolkit Area 630 is larger for exactly this reason, nevertheless any function available in Toolkit 220, 230, or 240 when displayed in Primary Toolkit Area 630 may also be performed when displayed in either Secondary Toolkit Area 640 or Tertiary Toolkit Area 650.

Within each Toolkit Area 630, 640, and 650 are corresponding sub-areas, Toolkit-Level Control Elements 631, 641, and 651 respectively, which are shown in the figure abbreviated as Toolkit Controls 641 and 651 when part of the smaller Secondary and Tertiary Toolkit Areas 640 and 650. Toolkit Controls areas 631, 641, and 651 respectively allocate space to present buttons, tabs, and menus associated with the Toolkit 220, 230, or 240 displayed in each Toolkit Area 630, 640, and 650. To the extent that such controls are different for each Toolkit 220, 230, or 240, the corresponding Toolkit Controls areas 631, 641, and 651 will display different buttons, tabs, and menus.

On the left side of the screen presented by GUI 260, Palette Area 620 allocates space to present the various Palettes 221, 222, 223, 224, 225, 231, 232, 233, and 234 found in Design Toolkits 220 and 230, as well as any that may be added throughout the life of Application Factory System 100. To the extent that buttons, tabs, or menus may be desired for manipulating a particular Palette or the Palettes in general, a Palette Controls area 621 is allocated within Palette Area 620. In addition, a Palette Selector Area 622 is provided for buttons, tabs, menus, or other means for selecting exactly which Palette's items should be displayed at any particular moment. However, the bulk of the space in Palette Area 620 will be occupied by icons representing the various items available from the selected Palette 221, 222, 223, 224, 225, 231, 232, 233, or 234, or other Palette as many be added from time to time during the life of Application Factory System 100.

It may be noticed that the graphic forms of Palette items and control elements are left unspecified here. In the present invention, various graphic forms may be provided according to the preferences of particular developers, with defaults chosen by the proprietor of Application Factory System 100. In a preferred embodiment, graphic forms are dependent upon the programming mode or level in which a particular developer is comfortable, and may take on the appearance of corresponding items in Scratch, Alice, Mindstorms, LabView, VPL, or other unrelated domains according to the visual representation of the programming mode or level. As developer feedback drives tuning of the visual representation, these specific graphic forms may evolve over the life of Application Factory System 100. The specific graphic forms may also be instantiated differently by different proprietors of different instances of Application Factory System 100. For these reasons, the specific graphic forms of Palette items and control elements are considered peripheral to the present invention, and the present invention is intended to enable the use of, as well as to incorporate, any and all possible configurations of such graphic forms.

The GUI 260 described here is an example. As is well known to those skilled in the art, multiple graphical forms may be used to accomplish the same ends and provide user access to the same set of functionality. Therefore, GUI 260 as shown here represents a preferred embodiment that enables execution of the present invention, and may at this writing be considered the best mode, yet multiple alternate embodiments are possible within, anticipated by, and not precluded by the present invention. Other examples may omit the Swap Buttons 642 and 652, and lock each Toolkit 220, 230 and 240 into specific Toolkit Areas 630, 640, and 650; allocate spaces to each Toolkit Area 630, 640, and 650 that have different sizes or different aspect ratios from those shown, including allocating the same sized space to each; allocate only one or two Toolkit Area spaces and provide other means than those previously described for selecting which Toolkits are displayed when, such as tabs; place the Toolkit Control areas 631, 641, and 651 in sections of their corresponding Toolkit Areas 630, 640, and 650 other than at the top; place the Palette Area 620 and Palette Selector Area 622 on the right, across the top, or across the bottom of the screen instead of on the left; or any of numerous other possibilities.

Figure 7:
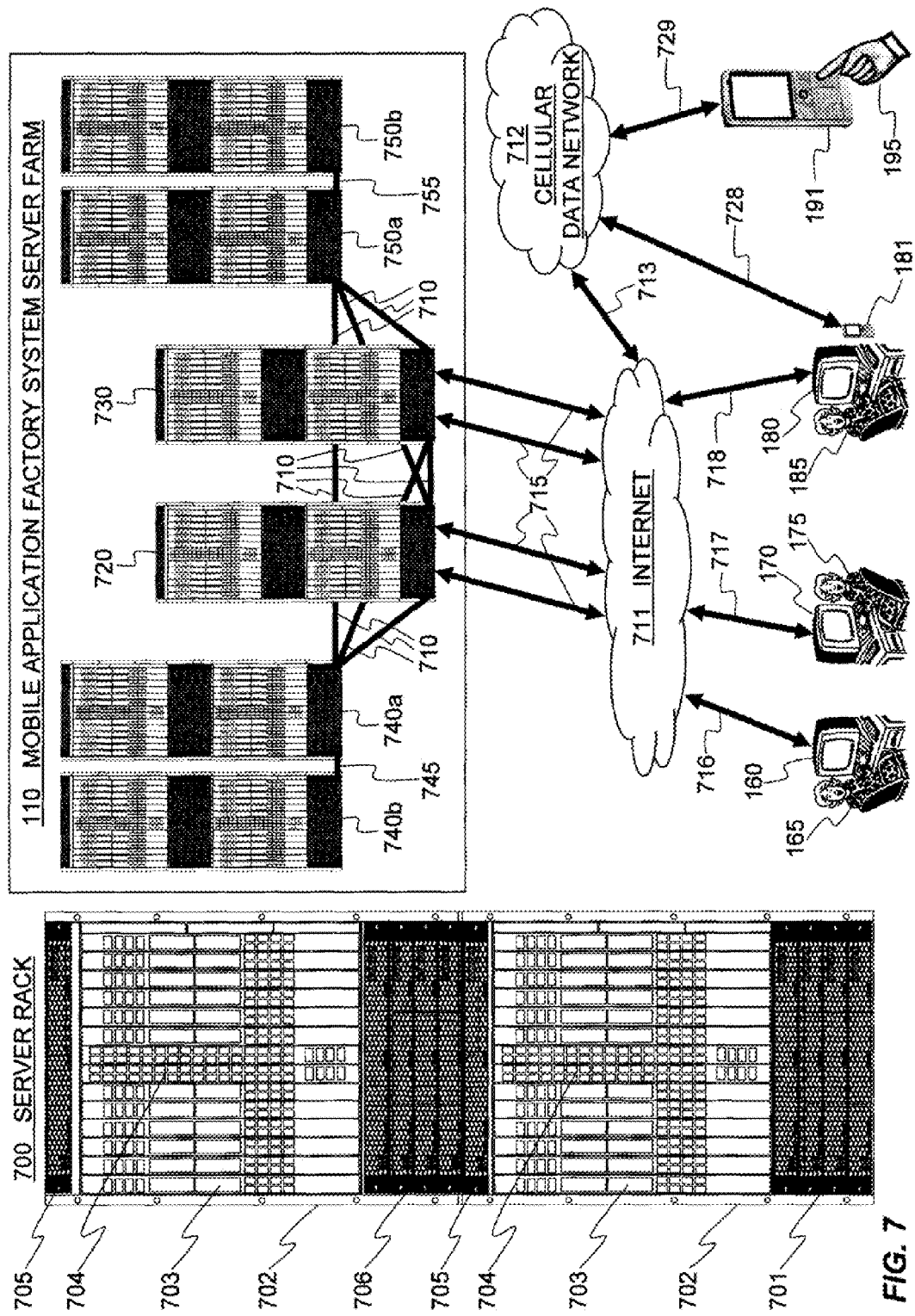
FIG. 7 illustrates an exemplary physical implementation architecture supporting a preferred embodiment of the system of the present invention.

FIG. 7 depicts a physical implementation architecture for Mobile Application Factory System 100 and its interacting elements, whereby each of the functional elements depicted in FIG. 1 may be executed and interconnected. Mobile Application Factory System Server Farm 110 is the primary physical vehicle for Mobile Application Factory System 100 itself. Physical elements of FIG. 1, specifically Novice Developer 165, Expert Developer 175, Internet Customer 185, Computers 160, 170, and 180, Mobile Customer 195, and Mobile Devices 181 and 191, are identical to the same elements in, and substantially as already described in the context of, FIG. 1.

Server Farm 110 and Computers 160, 170, and 180 used by developers and customers are all connected via high data rate Network Access Links 715, 716, 717, and 718, respectively, to the Internet 711, as is typical in distributed systems today and well understood by those skilled in the art. Internet 711 is in turn connected to Cellular Data Network 712, via high data rate Peer Network Link 713, so that Mobile Devices 181 and 191, attached to Cellular Data Network 712 via Cellular Data Access Links 728 and 729 respectively, may also reach Server Farm 110 and the services of Application Factory System 100. Multiple technologies are available for use in implementing Access Links 715, 716, 717, 718, 728, and 729, and are well known to those skilled in the art. As will also be readily evident to those skilled in the art, myriad additional developer and customer computers similar to Computers 160, 170, and 180, as well as multiple additional cellular data networks similar to Cellular Data Network 712, may be connected to Internet 711. Further, myriad additional mobile devices similar to Mobile Devices 181 and 191 may be connected to Cellular Data Network 712 and other cellular data networks like it. These extensions enable scaling of the present invention to encompass every possible developer, customer, and mobile device in the world.

In a preferred embodiment, Server Farm 110 consists of multiple copies of a replicable Server Rack 700, each containing multiple management, computing, data storage, and interconnection resources. Server Rack 700 is divided into several major equipment groups for the purpose of this description, but may be implemented using other layouts and physical resource proportions according to the specific needs of a particular Application Factory System 100 proprietor, as will be readily evident to one skilled in the art.

Starting at the bottom of the view depicting Server Rack 700, External Connectivity Equipment Group 701 incorporates common network routing and switching gear that provides, as the name implies, high data rate Internet Protocol connectivity to other instances of Server Rack 700 within Server Farm 110 and to networks outside Server Farm 110. In a preferred embodiment, External Connectivity Equipment Group 701 is implemented using off the shelf components well known to those skilled in the art, including high capacity redundant router-switches supporting so-called 10 Gigabit Ethernet links.

Next up the stack in Server Rack 700 is a Computing Shelf 702, which provides multiple slots for high-performance Computer Blades 703 that may be added according to capacity requirements, along with a pair of slots for redundant Shelf Connectivity Switches 704 that provide 10 Gigabit Ethernet links among the Blades 703 in Shelf 702 and similar links to other equipment groups within Server Rack 700. Shelf 702 also includes, without limitation, a Shelf Management Controller 705 that provides health and status, problem detection and recovery, and other related functionality. The figure depicts but one of multiple possible form factors for Shelf 702 and its subcomponents, which are preferably implemented using off the shelf components well known to those skilled in the art. Server Rack 700 may incorporate, as shown in the figure, a second Computing Shelf 702, along with its corresponding Computer Blades 703, Shelf Connectivity Switches 704, and Shelf Management Controller 705, if required for capacity.

In the middle of Server Rack 700 as shown, although not necessarily required to be in that position, is Data Storage Equipment Group 706, which comprises a scalable number of high-volume data storage resources such as multi-terabyte hard disk drives or multi-gigabyte solid-state drives that may be replicated according to capacity requirements. Here again, Data Storage Equipment Group 706 is implemented in a preferred embodiment using off the shelf components well known to those skilled in the art, and interconnected internally to the other equipment groups within Server Rack 700 using multiple 10 Gigabit Ethernet links.

Server Farm 110 then comprises a number of Server Racks 700 arranged as shown and as described here. In a preferred embodiment, each of the major functions of Application Factory System 100 is assigned to run in one or more Server Racks 700. Composition Studio 120 executes and keeps its data in Composition Studio Server 720; Distribution Center 130 executes and keeps its data in Distribution Center Server 730; Build Engine 140 executes and keeps its data in Build Engine Servers 740a and 740b interconnected by one or more 10 Gigabit Ethernet links shown as Intraconnect 745; and Verification Engine 150 executes and keeps its data in Verification Engine Servers 750a and 750b interconnected by one or more 10 Gigabit Ethernet links shown as Intraconnect 755. All the dedicated-function Server Racks 700 in Server Farm 110 are pairwise interconnected in a redundant fully-connected mesh network by Interconnects 710, each of which is implemented as one or more 10 Gigabit Ethernet links. Finally, Composition Studio Server 720 and Distribution Center Server 730, being hosts for front-end services Composition Studio 120 and Distribution Center 130, provide the endpoints within Server Farm 110 for connections to Internet 711 via high data rate Network Access Links 715. Note that each is shown with its own Links 715, and each is provided with redundant Links 715, so that no single route failure takes the Server Farm 110 and consequently Application Factory System 100 out of service.

In an alternate embodiment, the various functional subsystems or Application Factory System 100 are not assigned to dedicated Server Racks 700 within Server Farm 110, but instead are allocated to computation and data storage resources dynamically according to transaction traffic. The fully-connected mesh network of multiple 10 Gigabit Ethernet links is retained in this alternate embodiment, and Network Access Links 715 may be terminated on any or all Server Racks 700. In any case, the specific arrangement of servers and interconnects is subject to site engineering, using practices well known to those skilled in the art, according to the capacity requirements of Application Factory System 100.

The invention has been described above with reference to preferred embodiments. It is not intended that the invention be limited to the specific embodiments shown and described, but that the invention be limited in scope only by the claims appended hereto. It will be evident to those skilled in the art that various substitutions, modifications, and extensions may be made to the embodiments as well as to various technologies which are utilized in the embodiments. It will also be appreciated by those skilled in the art that such substitutions, modifications, and extensions fall within the spirit and scope of the invention, and it is intended that the invention as set forth in the claims appended hereto includes all such substitutions, modifications, and extensions.

We claim:

1. A method for creating, managing, distributing, and building a mobile device software application, comprising the computer-implemented steps of:

receiving a selection of at least one logic and data element from either an Event, Logic, Data, Math or Service Palette to a Data and Logic Canvas or at least one user interaction element from either a Graphic, Widget, Audio/Video, or Haptic Palette to a Multimedia User Interaction Canvas to form a Mobile Application or Mobile Application Component;

submitting said Mobile Application or Mobile Application Component to a Distribution Center;

distributing said Mobile Application or Mobile Application Component to a Mobile Device, wherein the Mobile Application is provided to the Mobile Device as a compiled executable application native to the Mobile Device; and submitting said Mobile Application or Mobile Application Component to a Build Engine for generating on-demand builds associated with each of a plurality of Specific Mobile Device Models, wherein generating each on-demand build comprises the computer-implemented steps of:

parsing each expression of a Mobile Application using a combined Compilation Set and Build Toolkit;

translating the parsed expression using syntactic analysis and compiler techniques and a selected Target Device-Specific Language Code Generator;

producing a new expression of a Compilation Set in the form of source code native to the Target Specific Mobile Device Model;

combining the new expression of a Compilation Set with one or more Precompiled Component Objects; and running the combined new expression of a Compilation Set with one or more Precompiled Component Objects through a compiler and linker associated with a Target Specific Mobile Device Mode selected from Target Device-Specific Software Development Kits and Tool Chains to produce a Target Device-Specific Executable.

2. The method in accordance with claim 1, further comprising the computer-implemented step of testing said Mobile Application or Mobile Application Component using a Generic Mobile Device Model Testing Module.

3. The method in accordance with claim 1, further comprising the computer-implemented step of verifying said Mobile Application or Mobile Application Component using a Specific Mobile Device Model.

4. The method in accordance with claim 1, further comprising the computer-implemented steps of:

testing said Mobile Application or Mobile Application Component using a Generic Mobile Device Model Testing Module;

compiling said Mobile Application or Mobile Application Component into an executable application suitable for a target Mobile Device;

submitting said Mobile Application or Mobile Application Component to a Build Engine for builds on multiple Specific Mobile Device Models; and verifying said Mobile Application or Mobile Application Component using a Specific) Mobile Device Model.

5. A non-transitory computer program product, comprising a computer usable medium having a computer readable program code embodied therein, said computer readable program code adapted to be executed to implement a method for creating, managing and distributing a mobile device software application, said method comprising:

receiving a selection of one or more logic and data elements from either an Event, Logic, Data, Math or Service Palette to a Data and Logic Canvas or one or more user interaction elements from either a Graphic, Widget, Audio/Video, or Haptic Palette to a Multimedia User Interaction Canvas to form a Mobile Application or Mobile Application Component;

submitting said Mobile Application or Mobile Application Component to a Distribution Center;

testing said Mobile Application or Mobile Application Component using a Generic Mobile Device Model Testing Module;

verifying said Mobile Application or Mobile Application Component as a natively executable element using a Specific Mobile Device Model; and distributing said Mobile Application or Mobile Application Component to a Mobile Device, wherein said distributing comprises:

receiving a request for a particular application via an on-demand download service;

determining a specific device model associated with the request;

generating an executable version of the particular application associated with the specific device model by submitting source code associated with the particular application to a build engine; and storing the executable version in an application repository accessible via the on-demand download service.

6. The non-transitory computer program product in accordance with method of claim 5, said method further comprising compiling said Mobile Application or Mobile Application Component into an executable application suitable for a target Mobile Device.

7. A system for creating, managing and distributing a mobile device software application, comprising: a Mobile Device Application or a Mobile Device Application Component formed by receiving a selection of at least one logic and data element from either an Event, Logic, Data, Math or Service Palette to a Data and Logic Canvas or at least one user interaction element from either a Graphic, Widget, Audio/Video, or Haptic Palette to a Multimedia User Interaction Canvas; a Generic Mobile Device Model for testing said Mobile Device Application or Mobile Device Application Component; a Composition Studio; and a Distribution Center.

8. The system of claim 7 further comprising:
a Specific Mobile Device Model;
a Build Engine; and
a Verification Engine.

9. The system of claim 7, wherein said Composition Studio comprises:
a Multimedia User Interaction Design Toolkit;
a Visual Programming Design Toolkit;
a Graphical User Interface;
an User Interface Support Module;
a Network Communication Support Module;
a Visual Verification Toolkit;
an Embeddable App Library Cache;
a Service Object Library Cache;
an User Interaction Object Library Cache;
a Distribution Center Library Client;
a Distribution Center Submission Client; and
a Visual and XML•Based Representation Language.

10. The system of claim 9, wherein said Multimedia Design Toolkit comprises:
a Graphic Palette;
a Widget Palette;
an Audio/Video Palette;
an Haptic Palette; and
a Multimedia User Interaction Canvas.

11. The system of claim 9, wherein said Visual Programming Design Toolkit comprises:

an Event Palette;
a Logic Palette;
a Data Palette;
a Math Palette;
a Service Palette; and
a Data and Logic Canvas.

12. The system of claim 9, wherein said Visual Verification Toolkit comprises:
a Build Engine Client;
a Verification Engine Client;
a Generic Mobile Device Model Testing Module;
a Generic Mobile Device Interface Simulator; and
a Generic Mobile Device Capability Simulator.

13. The system of claim 7, wherein said Distribution Center comprises:
a Mobile Application Demonstrator;
an On-Demand Download Service;
an User Interaction Services;
a Library Services;
a Distribution Service;
a Graphical User Interface;
a Web Application Server;
an User Database Module;
an User Interface Support Module; and
a Network Communication Support Module.

14. The system of claim 13, wherein said Mobile Application Demonstrator comprises:
a Generic Mobile Device Model Demonstrator; and
a Specific Mobile Device Selector and Simulators.

15. The system of claim 13, wherein said On-Demand Download Service comprises:
a Specific Mobile Device Selector;
a Build Engine Client;
an E-Commerce Engine; and
a Mobile Device Over-the-Air Delivery Module.

16. The system of claim 13, wherein said User Interaction Services comprises:
a Social Networking Toolkit;
a Reputation Toolkit; and
a Communication Toolkit.

17. The system of claim 13, wherein said Library Services comprises:
a Search Toolkit;
an Application Repository
a Service Object Repository; and
an User Interface Object Repository.

18. The system of claim 13, wherein said Distribution Service comprises:
a Composer Submission Service Module;
a Verification Engine Client; and
a Library Access Service Module.

19. The system of claim 8, wherein said Build Engine comprises:
a Target Device-Specific Executable;
a Target Device-Specific Software Development Kits and Tool Chains;
a Service Adaptation Framework;
a Compilation Set;
a Build Service;
a Computation Resource Management Module; and
a Network Communication Support Module.

20. The system of claim 19, wherein said Service Adaptation Framework comprises:
a Target Device-Specific Language Code Generators;
an XML-Based Representation Language Interpreter;
a Visual and XML-Based Representation Language;
a Precompiled Component Objects;
a Specific Mobile Device Selector; and
a Generic Mobile Device Model Build Toolkit.

21. The system of claim 19, wherein said Build Service comprises:
a Verification Engine Client;
a Service Responder Module; and
a Distribution Center Library Client Module.

22. The system of claim 8, wherein said Verification Engine comprises:
an Automatic Verification Framework;
an Interactive Verification Framework;
a Test Plan Database;
a Test Device Library;
an Objects to be Verified;
a Verification Service;
a Computation Resource Management Module; and
a Network Communication Support Module.

23. The system of claim 22, wherein said Automatic Verification Framework comprises:
a Test Case Execution Driver;
a Test Case Success Analyzer; and
a Test Device Interface.

24. The system of claim 22, wherein said Interactive Verification Framework comprises:
a Test Device Interface; and
a Sequence Recorder.

25. The system of claim 22, wherein said Test Plan Database comprises:
a Specific Mobile Device Test Cases;
a Developer-Supplied App/Component Tests; and
a Service Adaption Framework Test.

26. The system of claim 22, wherein said Test Device Library comprises:
a Generic Mobile Device Model Simulator;
a Specific Mobile Device Selector;
a Specific Mobile Device Simulators; and
a Specific Actual Mobile Devices.

27. The system of claim 22, wherein said Verification Service comprises:
a Service Responder Module;
an Interactive Verification Service; and
an Automated Verification Service.

28. An integrated web-based system adapted to compose, build, distribute, and verify mobile device software applications, the system comprising:
a composition studio adapted to receive a plurality of sets of selections, each set of selections associated with a set of software components and attributes associated with the set of software components;
a distribution center adapted to receive the source code associated with each set of software components and provide the set of software components for download to at least one mobile device;
a build engine adapted to receive build requests from the composition studio and distribution center and generate a plurality of executable objects, each executable object associated with a specific mobile device model and based on a particular set of software components; and
a verification engine adapted to test operation of each executable object using a library of test cases associated with at least one generic device model and at least one specific device model.

29. The integrated web-based system of claim 28, wherein the distribution center is further adapted to provide at least one set of software components to the composition studio to be included in a different set of selected software components.

30. The integrated web-based system of claim 28, wherein the distribution center is able to process on-demand download requests for a set of software components by determining a device type associated with a specific download request and generating a build request based at least party on the device type.

31. The integrated web-based system of claim 28, wherein the build engine is able to generate the plurality of executable objects based on the particular set of software components and a library of specific device models, each executable object associated with a specific device model.

32. The integrated web-based system of claim 28, wherein the composition studio comprises a set of palettes, each palette automatically constrained to a set of options able to be implemented by a specific device model.

33. The integrated web-based system of claim 28, wherein the verification engine is able to simulate events not available to a development device and allows evaluation of system-level user interaction capability.

34. The integrated web-based system of claim 28, wherein the composition studio provides access to at least one generic mobile device model comprising an interface allowing access to mobile device features including a cellular network connection, WiFi connection, Bluetooth connection, headphone port, universal serial bus port, video display screen, keypad, at least one speaker, at least one microphone, a set of environmental sensors, at least one camera, a light, global positioning system sensors and information, at least one haptic effector, and at least one temperature sensor.

35. The integrated web-based system of claim 28, wherein the library of test cases defines a set of user interactions with a mobile device software application under test, allowing automatic verification of said mobile device software application through simulation of the set of user actions and comparison of actual results versus expected results as expressed in each test case in the library of test cases.

* * * * *